United States Patent
Nwoke et al.

(10) Patent No.: US 12,266,090 B2
(45) Date of Patent: Apr. 1, 2025

(54) SYSTEMS AND METHODS FOR DETECTING DEFECTS IN POWDER MANUFACTURED COMPONENTS

(71) Applicant: The Boeing Company, Chicago, IL (US)

(72) Inventors: Dominic N. Nwoke, Spanaway, WA (US); Robert W. Grube, Edmonds, WA (US); Scott H. Fife, Roy, WA (US); Christopher H. Rees, Seattle, WA (US)

(73) Assignee: The Boeing Company, Arlington, VA (US)

( * ) Notice: Subject to any disclaimer, the term of this patent is extended or adjusted under 35 U.S.C. 154(b) by 367 days.

(21) Appl. No.: 18/045,223

(22) Filed: Oct. 10, 2022

(65) Prior Publication Data

US 2024/0119579 A1   Apr. 11, 2024

(51) Int. Cl.
  *G06T 15/08*   (2011.01)
  *G06T 7/00*   (2017.01)
(52) U.S. Cl.
  CPC ............ *G06T 7/0004* (2013.01); *G06T 15/08* (2013.01); *G06T 2207/10081* (2013.01)
(58) Field of Classification Search
  CPC ..................... G06T 7/004; G06T 15/08; G06T 2207/10081
  See application file for complete search history.

(56) References Cited

U.S. PATENT DOCUMENTS

| 8,897,534 | B2 | 11/2014 | Oeckl et al. |
| 10,194,874 | B2 | 2/2019 | Neuser et al. |
| 2004/0227766 | A1* | 11/2004 | Chou ............ G06T 15/04 345/582 |

FOREIGN PATENT DOCUMENTS

| EP | 2 405 260 | 1/2012 |
| JP | 2006-189349 | 7/2006 |

* cited by examiner

*Primary Examiner* — Sam Bhattacharya
(74) *Attorney, Agent, or Firm* — Walters & Wasylyna LLC

(57) ABSTRACT

A method for detecting defects includes steps of: (1) calculating an average value for intensity of CT image voxels in a neighborhood; (2) calculating a difference value for the intensity of the voxels in the neighborhood; (3) calculating a standard deviation for the intensity of the voxels in the neighborhood; (4) calculating a z-score for each one of the voxels; (5) identifying a cluster of neighboring ones of the voxels; (6) determining a cluster-boundary parameter of the cluster; and (7) classifying the cluster as a defect when the cluster-boundary parameter of the cluster is above a parameter threshold.

20 Claims, 10 Drawing Sheets

SYSTEMS AND METHODS FOR DETECTING DEFECTS IN POWDER MANUFACTURED COMPONENTS

FIELD

The present disclosure relates generally to non-destructive inspection and, more particularly, to methods for detecting defects in powder manufactured components.

BACKGROUND

Powder manufacturing refers to any one of a variety of manufacturing processes in which parts, also referred to as powdered parts, are made from powders. The powder manufacturing process enables parts to be made with complex geometry, while decreasing manufacturing costs. Powder manufacturing also enables powdered parts to be manufactured having a net or near net shape, which reduces material costs and waste.

Nondestructive inspection, also referred to as nondestructive testing, can be utilized to inspect and/or test a part without destroying, damaging, or otherwise impacting the integrity of the inspected part. As such, nondestructive inspection may be valuable for testing manufactured parts after fabrication to detect and/or quantify defects in the manufactured parts. However, there is a lack of nondestructive testing methodologies that are capable of testing powder manufactured parts in a manner that is economically and time efficient. Additionally, evaluation of nondestructive testing results is typically performed manually and is prone to human error.

Accordingly, those skilled in the art continue with research and development efforts in the field of nondestructive inspection and detection of defects in powder manufactured components.

SUMMARY

Disclosed are examples of a method for detecting a defect in a powder manufactured component, a computer implemented method for processing a computed tomography image to detect a defect in a powder manufactured component, a computer program product for processing a computed tomography image and detecting a defect in a powder manufactured component, and a data-processing system for processing a computed tomography image and detecting a defect in a powder manufactured component. The following is a non-exhaustive list of examples, which may or may not be claimed, of the subject matter according to the present disclosure.

In an example, the disclosed method includes steps of: (1) calculating an average value for intensity of each one of a plurality of voxels within a neighborhood of a computed tomography image; (2) calculating a difference value for the intensity of each one of the voxels in the neighborhood, the difference value being a difference between the average value for the intensity and an original value for the intensity of each one of the voxels; (3) calculating a standard deviation for the intensity based on the difference value for the voxels in the neighborhood; (4) calculating a z-score for each one of the voxels; (5) discarding ones of the voxels in which an absolute value of the z-score is less than a threshold value of the z-score; (6) identifying a cluster of neighboring ones of the voxels using a clustering algorithm; (7) determining a cluster-boundary parameter of the cluster; and (7) classifying the cluster as the defect when the cluster-boundary parameter of the cluster is above a parameter threshold.

In an example, the disclosed computer-implemented method includes steps of: (1) inputting the computed tomography image 104; (2) defining a part boundary for the powder manufactured component represented in the computed tomography image, voxels of the computed tomography image being located within the part boundary; (3) computing an average value for intensity of each one of a plurality of voxels within a neighborhood; (4) computing a difference value for the intensity of each one of the voxels in the neighborhood, the difference value being a difference between the average value for the intensity and an original value for the intensity of each one of the voxels; (5) computing a standard deviation for the intensity, based on the difference value, of the voxels in the neighborhood; (6) computing a z-score for each one of the voxels; (7) discarding ones of the voxels in which an absolute value of the z-score is less than a threshold value of the z-score; (8) identifying a cluster of neighboring ones of the voxels using a clustering algorithm; (8) outputting a cluster-boundary parameter of the cluster; and (9) classifying the cluster as the defect when the cluster-boundary parameter of the cluster is above a parameter threshold.

In an example, the disclosed computer program product causes a data-processing system to perform operations including: (1) calculating an average value for intensity of each one of a plurality of voxels within a neighborhood of a computed tomography image of a powder manufactured component; (2) calculating a difference value for the intensity of each one of the voxels in the neighborhood, the difference value being a difference between the average value for the intensity and an original value for the intensity of each one of the voxels; (3) calculating a standard deviation for the intensity of the voxels in the neighborhood; (4) calculating a z-score for each one of the voxels; (5) discarding ones of the voxels in which an absolute value of the z-score is less than a threshold value of the z-score; (6) clustering the voxels based on a clustering algorithm that satisfies at least one clustering parameter to identify a cluster of neighboring ones of the voxels; and (7) classifying the cluster as a defect when a cluster-boundary parameter of the cluster is above a parameter threshold Other examples of the disclosed method, computer-implemented method, computer program product, and data-processing system will become apparent from the following detailed description, the accompanying drawings, and the appended claims.

DETAILED DESCRIPTION

Figure 1:
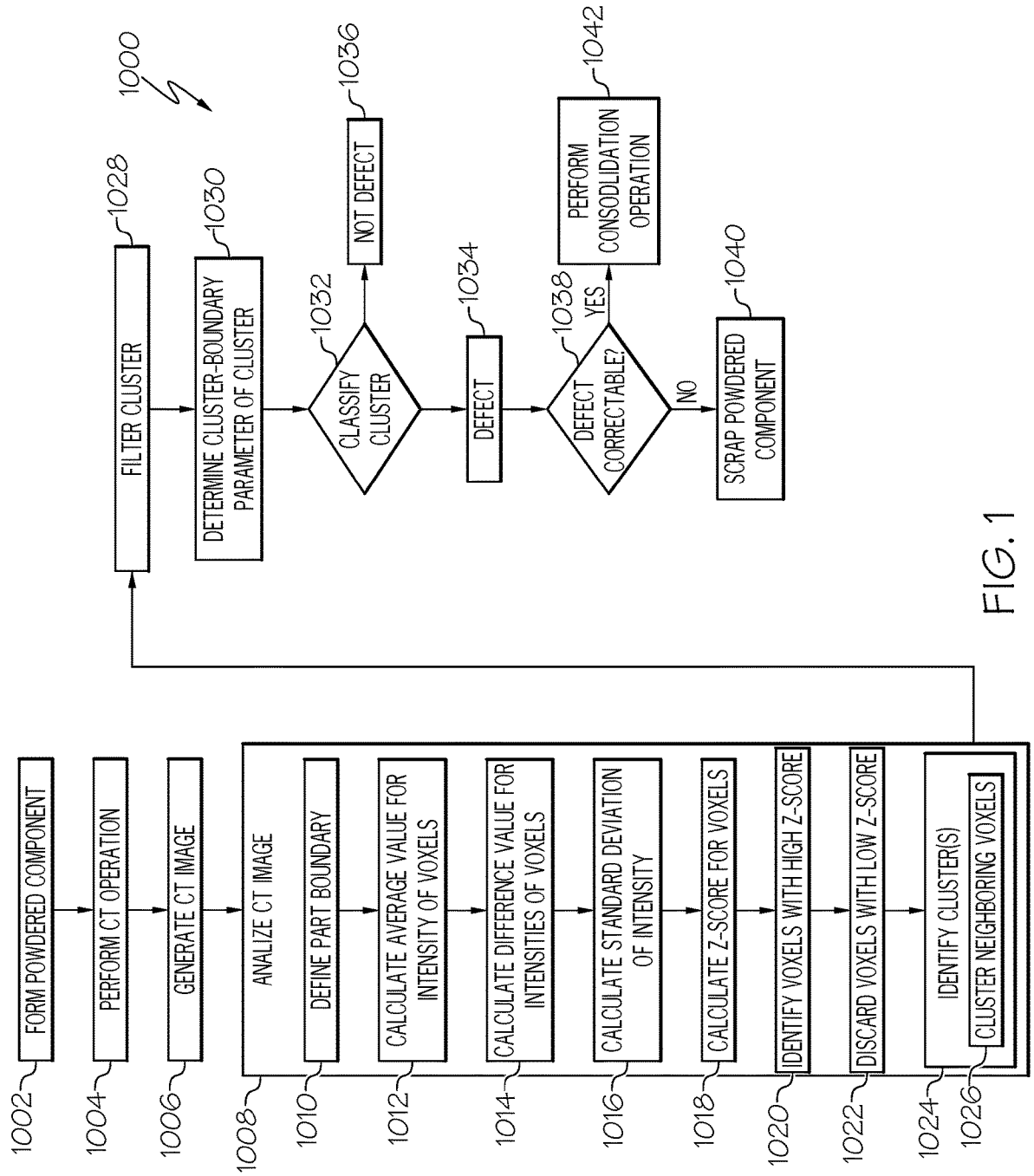
FIG. 1 is a flow diagram of an example of a method for detecting defects in a powder manufactured component.

Referring generally to FIGS. 1-12, the present disclosure is directed to methods and systems for nondestructive testing (NDT), also referred to as nondestructive inspection (NDI), of powder manufactured components. More particularly, the present disclosure is directed to methods and systems for detecting defects in powder manufactured components.

As used herein, a powder manufactured component, or powdered component, refers to a part, object, article, or other structure that is manufactured or is otherwise fabricated from powder material using a powder manufacturing process. As an example, the powder manufactured component is a powdered metal component fabricated from metallic powder using a suitable powder metallurgy process, such as additive manufacturing, metal powder casting, metal injection molding, and the like. As another example, the powder manufactured component is a powdered ceramic component fabricated from ceramic powder using a suitable ceramic forming process. As another example, the powder manufactured component is a powdered component fabricated from a mixture of different powder materials (e.g., metallic powder, ceramic powder, non-metallic powder, etc.) using a suitable powder manufacturing process.

The present disclosure recognizes that a powder manufactured component, or powdered component, undergoes various operational stages during manufacture. The particular operational stages may vary depending on the type of powder material (e.g., metallic powder, non-metallic powder, ceramic powder, powder mixtures, etc.) and/or the type of powder manufacturing process (additive manufacturing, metal injection molding, casting, cold isostatic pressing, etc.) used to fabricate the powdered component.

In one or more examples of a powder manufacturing process, a powder feedstock is provided, which includes a homogenous mixture of one or more powder materials. In some instances, the powder feedstock also includes a binder (e.g., in metal injection molding, casting, cold isostatic pressing, etc.). The powder feedstock then underdoes a forming operation (e.g., additive manufacturing, metal injection molding, casting, cold isostatic pressing, etc.) to form a precursor powdered component having a near net shape. In some instances, the precursor powdered component undergoes one or more de-binding operations to remove the binder, when present. In some instances, the precursor powdered component also undergoes an initial consolidation operation (e.g., sintering). In most instances, the precursor powdered component undergoes a final consolidation and densification operation (e.g., hot isostatic pressing) to produce a final form of the powdered component having the near net shape.

The present disclosure also recognizes that computed tomography is one technique for nondestructively testing powder manufactured components to detect defects in the powder manufactured components. However, conventional computed tomography analysis requires a human operator to manually review computed tomography data (e.g., computed tomography images). This manual review requires the operator to define and measure potential defects within a powder manufactured component and, ultimately, determine what is and what is not a defect. This manual process is time-consuming, tedious, and prone to error, such as underestimating the number of defects and/or measurable parameters (e.g., volume) of defects.

The methods and systems disclosed herein are applicable to utilizing computed tomography for nondestructive testing of powder manufactured components made by any one of various powder manufacturing processes. The methods and systems disclosed herein enable automated identification of pores or other areas of unsuitable or undesirable density on an interior of the powder manufactured component. The methods and systems disclosed herein further enable automated classification of such pores or other areas of unsuitable or undesirable density as defects when such pores or other areas of unsuitable or undesirable density are outside of an acceptable threshold. Accordingly, the methods and systems described herein beneficially provide real-time identification and analysis of potential defects in powder manufactured components and eliminate human operator error related to subjective identification and analysis of defects.

The present disclosure further recognizes that certain potential defects in the precursor form of the powder manufactured component may be corrected during the final consolidation and densification operation of the powder manufacturing process. As an example, potential defects below a given threshold (e.g., size and/or volume) may be corrected (e.g., reduced, closed, or otherwise eliminated) during a hot isostatic pressing operation. However, potential defects above a given threshold (e.g., size and/or volume) may be incapable of being corrected by the hot isostatic pressing operation. The present disclosure additionally recognizes that the hot isostatic pressing operation is costly and time consuming. Therefore, the ability to identify and classify defects in the precursor form of the powder manufactured component provides significant advantages.

Accordingly, the methods and systems disclosed herein enable the automated identification and classification of pores or other areas of unsuitable or undesirable density as defects in the powder manufactured component in both the precursor form (e.g., prior to final consolidation and densification via hot isostatic pressing) and the final form (e.g., after final consolidation and densification via hot isostatic pressing). Of particular benefit, the methods and systems disclosed herein enable automated identification of defects in the precursor form that are not correctable by the final consolidation and densification operation, thereby preventing final production of defective powdered components, reducing waste, and eliminating the costs and cycle times associated with final consolidation and densification of powdered components that would have otherwise been defective.

Figure 3:
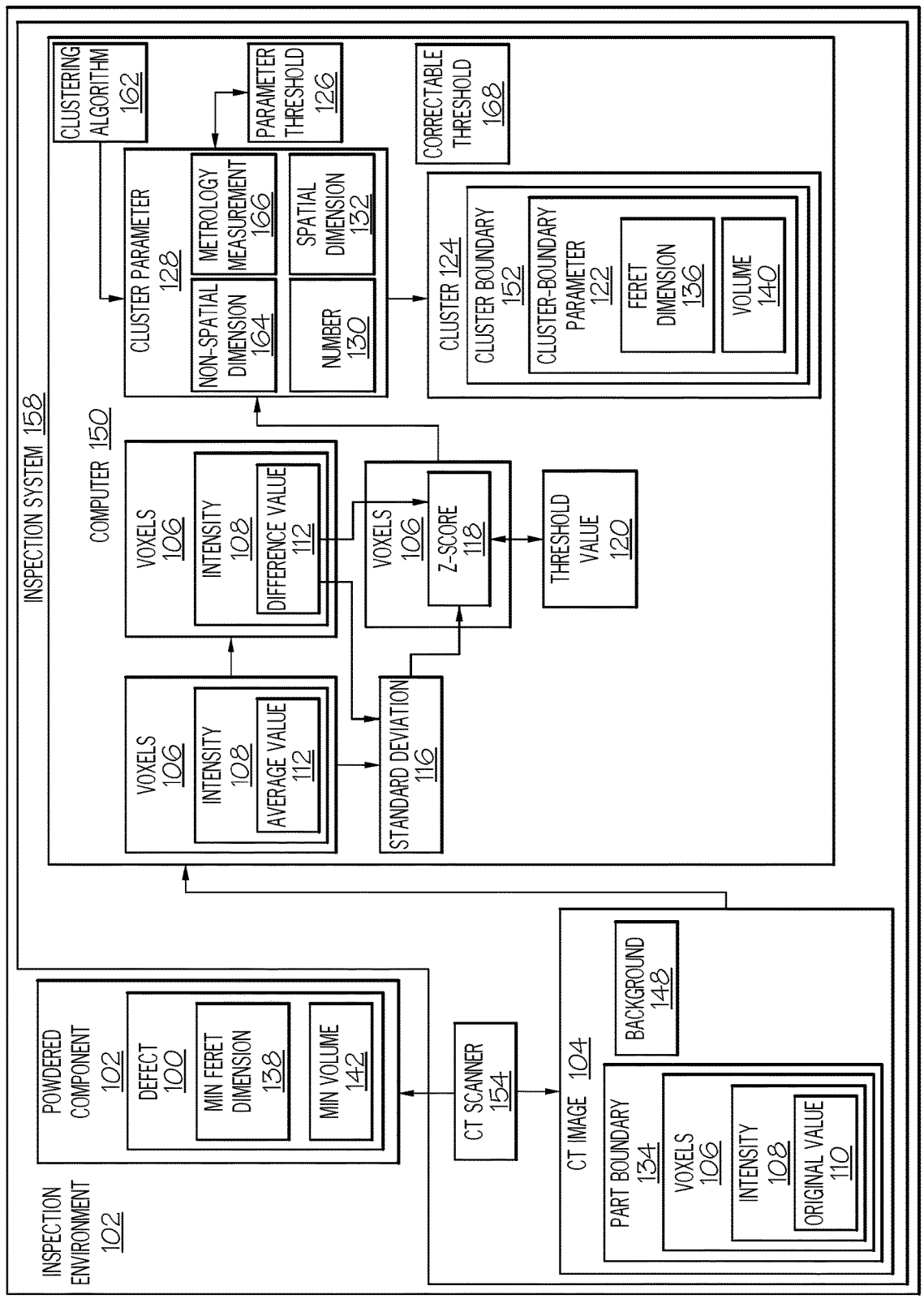
FIG. 3 is a block diagram of an example of an inspection environment.

FIG. 1 illustrates an example of a method 1000 for detecting a defect 100 in a powder manufactured component 102 (shown in FIG. 3). FIG. 3 schematically illustrates an example of an inspection environment (e.g., inspection system 158) in which examples of the method 1000 may be implemented.

Generally, for the purpose of the present disclosure, the term "defect" (e.g., the defect 100) refers to or includes any flaw, irregularity, or nonconformance on an interior of the powder manufactured component 102 that is outside of an acceptable tolerance or threshold, for example, as defined by a manufacturing specification. Examples of the defect 100 include, but are not limited to, pores of a size (e.g., dimension and/or volume) other than allowable (e.g., porosity defects), pores of a shape other than allowable (e.g., morphology defects), areas in which the powder material fails to properly or fully fuse (e.g., lack of fusion defects), areas in which the powder material has not fused (e.g., unfused powder defects), and the like. Such defects can occur due to operational settings of a powder manufacturing machine (e.g., power, speed, etc.) that may over-fuse or under-fuse the powder feedstock, contamination of the powder feedstock that may interfere with proper powder fusion, and the like.

Referring to FIGS. 1 and 3, in one or more examples, the method 1000 includes a step of (block 1002) forming the powder manufactured component 102. The powder manufactured component 102 is formed (e.g., fabricated or manufactured) from one or more suitable powder materials using any one of various suitable powder manufacturing processes. In some instances, the powder manufactured component 102 may include internal areas or regions of unsuitable or undesirable density (e.g., pores or areas of partially fused or unfused powder). Certain ones of such areas may be outside of an acceptable tolerance, which would classify such areas as the defect 100.

In one or more examples, the method 1000 includes a step of (block 1004) performing a computed tomography (CT) operation on the powder manufactured component 102. The CT operation produces computed tomography data. The method 1000 includes a step of (block 1006) generating a computed tomography (CT) image 104 (shown in FIG. 3). The CT image 104 is constructed from the computed tomography data.

In one or more examples, the CT operation is performed using a computed tomography (CT) scanner 154 (shown in FIG. 3). Any suitable type of CT scanner 154 may be utilized. Analysis of the CT image 104 enables detection, if present, of one or more of the defects 100 on an interior of the powder manufactured component 102.

Generally, the CT operation generates or produces a plurality of tomographic, or cross-sectional, images (e.g., virtual slices) of the powder manufactured component 102. These tomographic images are combined to produce or construct a three-dimensional image (e.g., the CT image 104) representing an exterior and an interior of the powder manufactured component 102.

The CT image 104 includes or is formed by a number of voxels 106. Each one of the voxels 106 is an image element that defines a point in three-dimensional space (e.g., having X, Y, and Z-coordinates) relative to a fixed coordinate system defined by the CT scanner 154. Each one of the voxels 106 is defined by its position (e.g., coordinates), intensity, and/or density. The number of voxels 106 forming the CT image 104 may be extremely large and may vary depending, for example, on the operating conditions of the CT operation and/or the resolution of the CT scanner 154.

In one or more examples, the method 1000 includes a step of (block 1008) analyzing the CT image 104. Analysis of the CT image 104 enables detection of one or more of the defects 100, if present. Analysis of the CT image 104 also enables automated identification of various measurable parameters of the defects 100, when present.

As described in more detail below, in one or more examples, the step of (block 1008) analyzing the CT image 104 utilizes computer vision techniques for blob detection and data clustering techniques to detect defects. As an example, each virtual slice of the three-dimensional CT image 104 is analyzed and localized regions of the image that differ in properties (e.g., intensity) compared to surrounding regions are detected and identified as blobs. A blob generally refers to a region of the image in which one or more properties are approximately constant. In other words, all the points (e.g., pixels or voxels) in the blob can be considered substantially similar to each other in with respect to at least one property. For the purpose of the present disclosure, a cluster 124 (e.g., shown in FIG. 3) of neighboring ones of the voxels 106, each having substantially similar values for intensity 108, is a blob.

In one or more examples, the method 1000 includes a step of (block 1010) defining a part boundary 134 (shown in FIG. 3) for the powder manufactured component 102 represented by the CT image 104. Generally, the part boundary 134 refers to an exterior (e.g., an exterior surface layer or shell) of the powder manufactured component 102 represented in the CT image 104. For the purposes of the present disclosure, ones of the image voxels (the voxels 106) located within (e.g., are bound by) the part boundary 134, are the voxels of interest and form the data set from the CT image to be analyzed. Other ones of the image voxels, located outside the part boundary 134, do not form the data set being analyzed and are discarded or ignored.

The part boundary 134 can be determined or defined using any suitable thresholding image processing technique for segmenting the CT image 104. As an example, all the voxels of the CT image 104 are separated into one of two classes based on a boundary condition. As an example, the boundary condition is the intensity 108 of each one of the voxels of the CT image 104. For example, an original value 110 for the intensity 108 of the voxel is used as the boundary condition. For the purpose of the present disclosure, the original value 110 for the intensity 108, which may also be referred to as the original intensity value, refers to a raw or observed value for the intensity 108 as represented in or interpreted from the CT data of the CT image 104.

The intensity 108 of a voxel 106 refers to, or is used to qualify or measure, X-ray attenuations by the powder manufactured component 102 during the CT operation. Visually, the intensity 108 may be represented as a brightness of the voxel 106. As an example, bright or light voxels 106 in the CT image 104 may visually indicate higher values for the intensity 108 and refer to an area where the density of the material is high relative to the space around it. As another example, dull or dark voxels 106 in the CT image 104 may visually indicate a lower value for the intensity 108 and refer to an area where the density of the material is low relative to the space around it (e.g., due to a pore or region of unfused powder). A value for the intensity 108 refers to a numerical value used to quantify the intensity 108 of the voxel 106. The original value 110 of the intensity 108 refers to a numerical value assigned to the voxel 106 representing the intensity 108 of the voxel 106 as represented or displayed in the CT image 104.

In one or more examples, during definition or determination of the part boundary 134, voxels of the CT image 104 having the original value 110 for the intensity 108 that are above a threshold intensity value are identified in a first class as the voxels 106 representing the powder manufactured component 102. Voxels of the CT image 104 having the original value 110 for the intensity 108 that are below the threshold intensity value are identified in a second class as voxels representing a background 148. The voxels of the CT image 104 having the original value 110 for the intensity 108 below the threshold intensity value (e.g., not forming the powder manufactured component 102) are masked or otherwise removed from analysis of the CT image 104. Therefore, the part boundary 134 forms a boundary between the voxels above the threshold intensity value (representing the powder manufactured component 102 in the CT image 104) and the voxels below the threshold intensity value (representing the background 148 in the CT image 104). In other words, the part boundary 134 represents the exterior (e.g., shell) of the powder manufactured component 102. Voxels within the part boundary 134 and above the threshold intensity value are designated as the voxels 106, which are included in analysis.

In one or more examples, the step of (block 1010) defining the part boundary 134 is performed using Otsu's method. However, other suitable thresholding techniques may also be used.

In one or more examples, some of the voxels 106 representing the interior the powder manufactured component 102 may be undesirably masked by the thresholding operation and undesirably removed from analysis. As an example, certain ones of the voxels of the CT image 104 having the original value 110 for the intensity 108 below the intensity threshold value may still represent the powder manufactured component 102 and should be classified as the voxels 106 for analysis. This can occur due to errors in the CT scan or potential defects in the powder manufactured component 102 (e.g., areas on the interior of the powder manufactured component 102 being less dense than surrounding areas due to oversized pores or regions of unfused powder). Therefore, one or more smaller boundaries may be created between the voxels above the threshold intensity value and the voxels below the threshold intensity value on the interior of the powder manufactured component 102.

As such, in the above examples, the method 1000 also includes a step of selecting the largest boundary between the voxels above the threshold intensity value and the voxels below the threshold intensity value from a plurality of boundaries and a step of designating or setting the largest one of the boundaries as the part boundary 134. Therefore, all the voxels located within the part boundary 134 (e.g., the largest and/or selected one of the plurality of boundaries) are designated as the voxels 106 for analysis.

In one or more examples, the method 1000 includes a step of (block 1012) calculating an average value 112 (shown in FIG. 3) for the intensity 108 of each one of the voxels 106 within a neighborhood 160 (FIG. 5) of the CT image 104. The average value 112 for the intensity 108, which may also be referred to as average intensity value, is calculated for all (e.g., an entirety of) the voxels 106 in the data set of the CT image 104 (e.g., within the part boundary 134). However, the average value 112 for the intensity 108 of each voxel 106 is calculated relative to surrounding voxels 106 in a localized region around that voxel 106, referred to herein as the neighborhood 160. For the purpose of the present disclosure, the term neighborhood has its ordinary meaning in topology and related areas of mathematics. Generally, the neighborhood 160 of the voxel 106 is or includes a set of voxels 106 containing that voxel 106 where a location can be moved some amount in any direction away from that voxel 106 without leaving the set of voxels 106.

In one or more examples, according to the method 1000, the step of (block 1012) calculating the average value 112 for the intensity 108 of each one of the voxels 106 includes a step of averaging the original value 110 for the intensity 108 of one of the voxels 106 and the original value 110 for the intensity 108 of every adjacent one of the voxels 106 in the neighborhood 160. As an example, the average value 112 for the intensity 108 of a given one of the voxels 106 is a sum of the original values 110 for the intensity 108 of the given one of the voxels 106 and all other ones of the voxels 106 that are in the neighborhood 160, divided by the total number of the voxels 106. As described above, this process is performed for each and every one of the voxels 106 relative to the neighborhood 160 associated with the respective voxel 106. In other words, each one of the voxels 106 has its own neighborhood 160 of surrounding voxels 106.

The relative size of the neighborhood 160 and/or the number of voxels 106 that form the neighborhood 160 can vary as desired. Generally, the voxel of interest or core voxel is at the center of the neighborhood 160. As examples, the neighborhood 160 may be relatively small, for example, including 27 voxels in a 3×3×3 matrix, 125 voxels in a 5×5×5 matrix, and the like. As other examples, the neighborhood 160 may be larger, for example, including 46,656 voxels in a 36×36×36 matrix, 216,000 voxels in a 60×60×60 matrix, 1,728,000 voxels in a 120×120×120 matrix, and the like. Other examples, the neighborhood 160 may be even larger, for example, including any suitable number of voxels.

In one or more examples, according to the method 1000, the step of (block 1012) calculating the average value 112 for the intensity 108 of each one of the voxels 106 includes a step of performing a three-dimensional gaussian smoothing (e.g., blur) operation. For example, a gaussian convolutional kernel (e.g., blur) technique can be used that weights a center of a sphere higher than an outer perimeter of the sphere (i.e., the farther from center, the smaller the weight is), thus the average value 112 for the intensity 108 of the voxel 106 is a blur of its surrounding. In other examples, any suitable kernel or convolution matrix image processing technique can be used to obtain the average value 112 for the intensity 108 of each one of the voxels 106.

In one or more examples, the neighborhood 160 is formed by a gaussian kernel with a radius of N, wherein N can be any number, such as 60. Values can be down weighted in the average as the distance away from the base voxel increases. As an example, the voxels 106 directly adjacent to the core or base voxel 106 have equal weight, which is a second highest weight in the kernel. The highest weight in the kernel is the base or core voxel 106 at the center. The voxels that are at half diagonals have the next highest weights. The voxels 106 at corners of have the next highest. This down weighting continues out all the way out to N voxels in every direction.

Use of local regions (the neighborhoods 160) limits analysis to regions of similar intensity 108 and utilize spatial information or spatial proximity to ensure more accurate results. Variations in the intensity 108 can be an artifact of the CT metrology and may not represent actual differences in the density of the material at different local regions. Use of the neighborhood 160 treats variances as being localized. Thus, average intensity values are determined, and image analysis is performed for a number of neighborhoods. As such, the average value 112 for the intensity 108 is a local average for the intensity 108 of each voxel 106 relative to its neighborhood 160.

Ultimately, the size of the neighborhood 160, or radius of the kernel, determines the number of voxels 106 used in the analysis. Typical kernel radius values are a radius of between 15 and 100 voxels. As described herein below, further operational steps (e.g., computation and analysis) of the CT image analysis (e.g., block 1008) is performed in the kernel or is relative to the neighborhood 160.

In one or more examples, the method 1000 includes a step of (block 1014) calculating a difference value 114 (FIG. 3) for the intensity 108 of each one of the voxels 106 in the neighborhood 160. The difference value 114 is a difference between the average value 112 (FIG. 3) for the intensity 108 of the voxel 106 and the original value 110 (FIG. 3) for the intensity 108 of the voxel 106.

In one or more examples, the method 1000 includes a step of (block 1016) calculating a standard deviation 116 (FIG. 3) for the intensity 108 for each one of the voxels 106 in the neighborhood 160. The standard deviation 116 is based on the difference value 114. The standard deviation 116 is calculated for all of the voxels 106 (e.g., an entire population of the voxels 106 in the data set and located within the part boundary 134) representing the powder manufactured component 102 in the CT image 104. However, as described above, the standard deviation 116 for each voxel 106 is calculated relative to or is based on its associated neighborhood 160. Therefore, the standard deviation 116 may also be referred to as a localized standard deviation.

As used herein standard deviation has its ordinary meaning in related areas of statistics and mathematics. Generally, the standard deviation 116 represents, or is a measurement of, the amount of variation in the individual values for the intensity 108 of the entire population of the voxels 106 relative to the mean value for the intensity 108 of the entire population of the voxels 106. A low standard deviation indicates that the values for the intensity 108 tend to be close to the mean value (also called the expected value) for the intensity 108 of the population, while a high standard deviation indicates that the values for the intensity 108 are spread out over a wider range.

In one or more examples, the method 1000 includes a step of (block 1018) calculating a z-score 118 (FIG. 3) for each one of the voxels 106. As used herein, z-score, also called the standard score, has its ordinary meaning in related areas of statistics and mathematics. Generally, the z-score 118 is a measure of how many the standard deviations 116 the difference value 114 for intensity 108 of a given one of the voxels 106 is below or above the mean value for the intensity 108. In other words, the z-score 118 indicates how far from the mean value of the intensity 108 the average value 112 for the intensity 108 of a given one of the voxels 106 (e.g., a data point) is. In one or more examples, the z-score 118 for each one of the voxels 106 is calculated by dividing the difference value 114 by the standard deviation 116.

The z-score 118 is calculated for all of the voxels 106 (e.g., an entire population of the voxels 106 in the data set and located within the part boundary 134) representing the powder manufactured component 102 in the CT image 104. However, as described above, the z-score 118 for each voxel 106 is calculated relative to or is based on its associated neighborhood 160. Therefore, the z-score 118 may also be referred to as a localized z-score.

The method 1000 uses the z-scores 118, computed locally for each one of the voxels 106, to identify outliers or voxels 106 that have extreme values for the z-score 118. A voxel 106 that has an extreme value (e.g., greater than 2, greater than 2.5, greater than 3, etc.) for the z-score 118 represents a point of interest within the powder manufactured component 102. Neighboring voxels 106, each having an extreme value for the z-score 118 can be grouped together to represent areas of nonconforming density within the powder manufactured component 102, such as potential defects.

Referring still to FIG. 1 and to FIG. 3, in one or more examples, the method 1000 includes a step of (block 1020) identifying the voxels 106 with high or extreme values for the z-score 118. As an example, ones of the voxels 106 in which an absolute value of the z-score 118 is above a threshold value 120 of the z-score 118 are identified as high z-score, which indicate a high variance from normal and an area of interest for further analysis. In one or more examples, the method 1000 also includes a step of (block 1022) discarding the voxels 106 with low or non-extreme values for the z-score 118. As an example, ones of the voxels 106 in which the absolute value of the z-score 118 is less than the threshold value 120 of the z-score 118 are identified as low z-score, which indicate a low variance from normal and are discarded.

In one or more examples, the method 1000 includes a step of comparing the z-score 118 of each one of the voxels 106 to the threshold value 120. The threshold value 120 is a numerical value to which the z-score 118 is compared to determine whether the value for the intensity 108 of the voxel 106 is within a normal distribution of expected values or is outside of the expected values.

Generally, discarding the voxels 106 that have a low z-score (e.g., voxels 106 in which the absolute value of the z-score 118 is below the threshold value 120) reduces the size of the data set or reduces the number of voxels 106 that remain for further analysis, such as clustering and classification for defect detection. In other words, grouping, clustering, and classifying operations of the image analysis (e.g., block 1008) is performed only on the remaining voxels 106 with high z-scores (e.g., voxels in which the absolute value of the z-score 118 is above the threshold value 120).

Thus, All the voxels 106 with the z-scored 118 having an absolute value greater than the threshold value 120 (e.g., extremely high z-scores) are identified and collected. Any of the voxels 106 with the z-scored 118 having an absolute value less than the threshold value 120 (e.g., low or normal z-scores) are ignored. This process greatly reduces the population of voxels 106 that are available for clustering and enables implementation of a clustering algorithm 162 feasible by a computing device (e.g., computer 150 shown in FIG. 3). The clustering algorithm 162 utilizes the clustering parameters 128 as criteria for what makes the voxels 106 neighbors and, thus, to determine which voxels 106 are clustered to form the cluster 124.

In one or more examples, the method 1000 includes a step of (block 1024) identifying a cluster 124 (e.g., one or more clusters 124) of neighboring ones of the voxels 106 using the clustering algorithm 162 (FIG. 3). In one or more examples, the step of (block 1024) identifying the cluster 124 includes a step of (block 1026) clustering the neighboring ones of the voxels 106 based on the clustering algorithm 162 that satisfies or that is based on at least one clustering parameter 128.

The at least one clustering parameter 128 includes one or more suitable metrics that determines which ones of the voxels 106 are a neighbor of another one of the voxels 106 and/or that quantify a similarity between the voxels 106, such that those "neighboring" voxels 106 are grouped or "clustered" together. Neighboring ones of the voxels 106 refers to a group of the voxels 106 that includes a given one voxel 106 and those voxels 106 surrounding the given one of the voxels 106. Designation of neighboring ones of the voxels 106 is made based on the at least one clustering parameter 128 (FIG. 3). Therefore, the step of (block 1026) clustering results in or provides one or more clusters 124. Each cluster 124 includes or is formed by a grouping of the neighboring ones of the voxels 106 having some similarity.

In one or more examples, the at least one clustering parameter 128 includes a spatial dimension 132 (FIG. 3) between each one of the voxels 106 and an adjacent one of the voxels 106. As an example, the spatial dimension 132 is a minimum distance in the X-direction, Y-direction, or Z-direction from one voxel 106 to another voxel 106 that makes the voxels 106 neighbors. For example, the spatial dimension 132 defines a clustering threshold or trigger determining when two voxels 106 can be clustered together, such as a minimum distance or dimension between a center of one the voxels 106 and a center of a neighboring one of the voxels 106.

As an example, when the distance between one of the voxels 106 (e.g., in the X-direction, Y-direction, or Z-direction) and another one of the voxels 106, each having the absolute value of the z-score 118 above the threshold value 120, is greater than the minimum distance (e.g., the clustering parameter 128), those voxels 106 are not grouped together or clustered to form the cluster 124. Alternatively, when the distance between one of the voxels 106 and another one of the voxels 106, each having the absolute value of the z-score 118 above the threshold value 120, is equal to or less than the minimum distance (e.g., the clustering parameter 128), those voxels 106 are grouped together or clustered to form the cluster 124.

Thus, in one or more examples, the neighboring ones of the voxels 106 that are clustered together to form the cluster 124 are those voxels 106 that have the high z-scores and that satisfy the spatial dimension 132 of the clustering parameter 128. In these examples, the method 1000 includes clustering neighboring ones of the voxels 106 in which the absolute value of the z-score 118 is above the threshold value 120 of the z-score 118 and the spatial dimension 132 (e.g., minimum distance) is satisfied.

In one or more examples, the at least one clustering parameter 128 also includes a non-spatial dimension 164 (FIG. 3), such as between each one of the voxels 106 and an adjacent one of the voxels 106. The non-spatial dimension 164 is any suitable quantifiable characteristic of the voxels 106 that can serve as a fourth dimension or fourth coordinate for clustering. In one or more examples, the non-spatial dimension 164 is the z-score 118. In one or more examples, the non-spatial dimension 164 is a normalized z-score (e.g., the z-score 118 with a value that is adjusted to a notionally common scale with the dimensional values of the spatial dimension 132). In one or more examples, the non-spatial dimension 164 is another suitable metrology measurement 166.

As an example, the clustering operation (e.g., block 1026) and, thus, a determination of what makes neighboring ones of the voxels, performed by the clustering algorithm 162 is based on a minimum distance between voxels 106 (e.g., the spatial dimension 132) and the relative closeness or similarity in the z-scores 118 (e.g., raw or normalized z-scores) of the voxels 106 (e.g., the non-spatial dimension 164). Use of the non-spatial dimension 164, such as the z-score 118, prevents coalescence and clustering of spatially nearby voxels 106 that meet the spatial dimension 132 criteria when the difference in the z-scores 118 is too large or exceeds a desired or predetermined criteria or threshold. Generally, voxels 106 having different enough z-scores 118 tend to indicate different potential defects 100 even though the voxels 106 are spatially close to each other. In certain instances, it may be desirable to prevent clustering of voxels 106 having relatively lower z-scores 118 (e.g., 4-6) with spatially close voxels 106 having relatively higher z-scores 118 (e.g., 7-9). In an even more extreme instance, it may be desirable to prevent clustering of voxels 106 having negative z-scores 118 (e.g., −5) with spatially close voxels 106 having positive z-scores 118 (e.g., +5). The present disclosure recognizes that such large differences in z-scores 118 may represent a trapped powder inclusion next to an opening or void, which are different types of defects that shouldn't be clustered together.

As an example, when the distance between one of the voxels 106 (e.g., in the X-direction, Y-direction, or Z-direction) and another one of the voxels 106, each having the absolute value of the z-score 118 above the threshold value 120, is equal to or less than the minimum distance but the difference between the z-scores 118 of those voxels 106 is greater than a minimum threshold, those voxels 106 are not grouped together or clustered to form the cluster 124. Alternatively, when the distance between one of the voxels 106 (e.g., in the X-direction, Y-direction, or Z-direction) and another one of the voxels 106, each having the absolute value of the z-score 118 above the threshold value 120, is equal to or less than the minimum distance and the difference between the z-scores 118 of those voxels 106 is less than a minimum threshold, those voxels 106 are grouped together or clustered to form the cluster 124.

In one or more examples, the method 1000 includes a step of (block 1028) filtering the cluster 124. In one or more examples, the cluster 124, for example, one or more clusters 124 of neighboring ones of the voxels 106 identified based on the clustering algorithm 162, is filtered based on a number 130 of voxels 106 in the cluster 124. As an example, a cluster 124 having a small number of voxels 106 can be removed or discarded from further analysis as tending to represent noise, thus, reducing the number of clusters 124 to be further analyzed. In other examples, the cluster 124 is filtered based on size, dimension, volume, or other characteristic.

In one or more examples, the method 1000 includes a step of (block 1030) determining a cluster-boundary parameter 122 of the cluster 124 (shown in FIG. 3). The cluster-boundary parameter 122 refers to a measurable parameter or characteristic of the cluster 124. The cluster-boundary parameter 122 is used to determine whether or not the cluster 124 is the defect 100.

In one or more examples, the method 1000 includes a step of (block 1032) classifying the cluster 124. In one or more examples, the step of (block 1032) classifying the cluster 124 includes a step of determining whether the cluster 124 is the defect 100 or is not the defect 100. As an example, the cluster 124 is classified as the defect 100 when the cluster-boundary parameter 122 of the cluster 124 is above a parameter threshold 126 (FIG. 3). Alternatively, the cluster 124 is classified as not the defect 100 when the cluster-boundary parameter 122 of the cluster 124 is below the parameter threshold 126.

In one or more examples, the parameter threshold 126 is a numerical value of the measurable parameter or characteristic of the cluster 124 to which the cluster-boundary parameter 122 is compared to determine whether the cluster 124 is the defect 100.

In one or more examples, the method 1000 includes a step of comparing the cluster-boundary parameter 122 of the cluster 124 to the parameter threshold 126. The method 1000 also includes a step of (block 1034) identifying (e.g., classifying) the cluster 124 as the defect 100 when the cluster-boundary parameter 122 of the cluster 124 is above (e.g., greater than or equal to) the parameter threshold 126. Alternatively, the method 1000 includes a step of (block 1036) identifying the cluster 124 as not the defect 100 when the cluster-boundary parameter 122 of the cluster 124 is below (e.g., less than) the parameter threshold 126.

In one or more examples, according to the method 1000, the cluster-boundary parameter 122 includes or takes the form of a feret dimension 136 (FIG. 3) of the cluster 124. In these examples, the parameter threshold 126 includes or takes the form of a minimum feret dimension 138 (FIG. 3) of the defect 100. Generally, the minimum feret dimension 138 of the defect 100 is the smallest dimension that would qualify as a defect and anything less than the minimum feret dimension 138 would be within manufacturing tolerances and, thus, not a defect. Therefore, the cluster 124 is classified as the defect 100 when the feret dimension 136 of the cluster 124 is equal to or greater than the minimum feret dimension 138 of the defect 100.

A feret dimension, or feret diameter, refers to a measure of the size of an object (e.g., the cluster 124 or the defect 100) along a specified direction. As an example, the feret dimension is the distance between two parallel planes restricting the object (e.g., a cluster-boundary 152 of the cluster 124 or a boundary of the defect 100). In one or more examples, as used herein, the feret dimension refers to the maximum feret dimension or the largest dimension in the X,Y,Z-directions of an asymmetric object.

In one or more examples, according to the method 1000, the cluster-boundary parameter 122 includes or takes the form of a volume 140 (FIG. 3) of the cluster 124. In these examples, the parameter threshold 126 includes or takes the form of a minimum volume 142 (FIG. 3) of the defect 100. Generally, the minimum volume 142 of the defect 100 is the smallest volume that would qualify as a defect and anything smaller than the minimum volume 142 would be within manufacturing tolerances and, thus, not a defect. Therefore, the cluster 124 is classified as the defect 100 when the volume 140 of the cluster 124 is equal to or greater than the minimum volume 142 of the defect 100.

As described above, example implementations of the method 1000 can be used to detect the defect 100 in the powder manufactured component 102 in the precursor form (e.g., before final consolidation and densification) or in the final form (e.g., after final consolidation and densification). When implementations of the method 1000 are used to detect the defect 100 in the precursor form of the powder manufactured component 102, the defect 100 can be classified as correctable or not correctable via the final consolidation and densification operation (e.g., hot isostatic pressure).

In one or more examples, the method 1000 includes a step of (block 1038) determining whether the defect 100 is correctable by a consolidation operation. As used herein, correctability refers to the capacity of the defect 100 in the precursor form of the powder manufactured component 102 to be brought within acceptable manufacturing tolerances or limits during the final consolidation and densification operation. As an example, correctability refers to the reducing the size (e.g., dimensions or volume) of the defect 100 to be within an acceptable tolerance or within a specified threshold.

In one or more examples, a correctability threshold 168 (FIG. 3) may be known based on the operating parameters of the final consolidation and densification operation (e.g., hot isostatic pressing) and the type and size of the powder manufactured component 102. As an example, the defect 100, identified by the cluster 124 having the cluster-boundary parameter 122 (e.g., dimension or volume) above the correctability threshold 168 may be classified as not correctable. Alternatively, the defect 100, identified by the cluster 124 having the cluster-boundary parameter 122 (e.g., dimension or volume) below the correctability threshold 168 may be classified as correctable In one or more examples, the method 1000 includes a step of (block 1040) scrapping the powder manufactured component 102 when the defect 100 is determined to be not correctable. Alternatively, in one or more examples, the method 1000 includes a step of (block 1042) performing a final consolidation and densification operation on the powder manufactured component 102 when the defect 100 is determined to be correctable.

Figure 2:
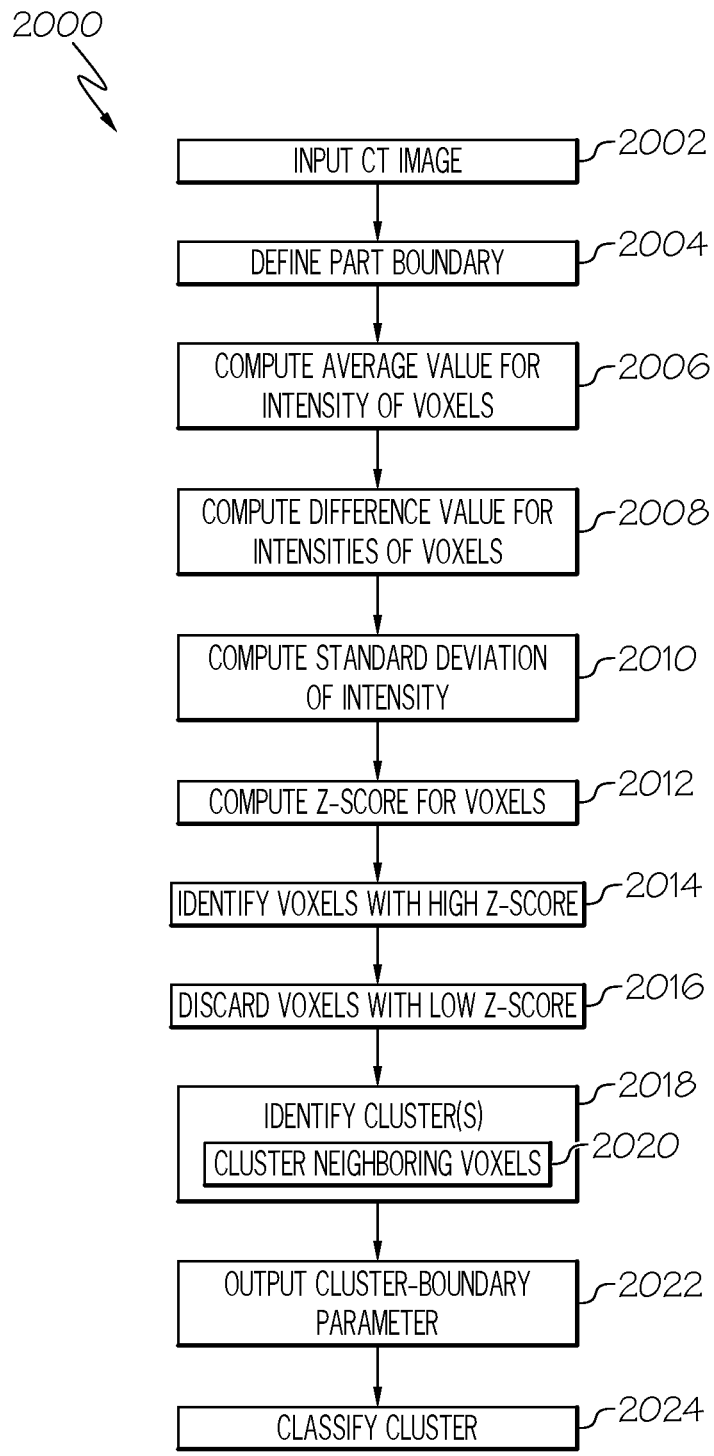
FIG. 2 is a flow diagram of an example of a computer-implemented method for detecting defects in a powder manufactured component.

FIG. 2 illustrates an example of a computer-implemented method 2000 for processing the CT image 104 to detect the defect 100 in the powder manufactured component 102. In one or more examples, the method 2000 is directed to computer implementation of a portion of the method 1000 (FIG. 1), such as the step of (block 1008) analyzing the CT image 104, the step of (block 1030) determining the cluster-boundary parameter 122 of the cluster 124, the step of (block 1032) classifying the cluster 124, and the step of (block 1038) determining whether the defect 100 is correctable.

Referring to FIGS. 2 and 3, in one or more examples, the method 2000 includes a step of (block 2002) inputting the CT image 104. In one or more examples, the CT image 104 is generated or produced by the CT scanner 154 and is provided to the computer 150 (FIG. 3).

In one or more examples, the method 2000 includes a step of (block 2004) defining the part boundary 134. The part boundary 134 can be defined or otherwise determined as described above with respect to the method 1000. As an example, the step of (block 2004) defining the part boundary 134 is performed by computer implementation of Otsu's method or other suitable thresholding technique.

In one or more examples, the method 2000 includes a step of (block 2006) computing the average value 112 for the intensity 108 of each one of the voxels 106 with the neighborhood 160 of the CT image 104. In one or more examples, according to the method 1000, the step of (block 2006) computing the average value 112 for the intensity 108 of each one of the voxels 106 includes a step of averaging the original value 110 for the intensity 108 of one of the voxels 106 and the original value 110 for the intensity 108 of every other one of the voxels 106 in the neighborhood 160. In one or more examples, according to the method 1000, the step of (block 2006) computing the average value 112 for the intensity 108 of each one of the voxels 106 includes a step of performing a three-dimensional gaussian smoothing operation.

In one or more examples, the method 2000 includes a step of (block 2008) computing the difference value 114 for the intensity 108 of each one of the voxels 106 in the neighborhood 160. The difference value 114 is computed as the difference between the average value 112 for the intensity 108 of each one of the voxels 106 and the original value 110 for the intensity 108 of each one of the voxels 106.

In one or more examples, the method 2000 includes a step of (block 2010) computing the standard deviation 116 for the intensity 108 of the voxels 106 in the neighborhood 160. In one or more examples, the method 2000 includes a step of (block 2012) computing the z-score 118 for each one of the voxels 106.

In one or more examples, the method 2000 includes a step of (block 2014) identifying the voxels 106 with high z-scores and a step of (block 2016) discarding the voxels 106 with the low z-scored. As an example, ones of the voxels 106 in which the absolute value of the z-score 118 is less than the threshold value 120 of the z-score 118 are discarded.

In one or more examples, the method 2000 includes a step of (block 2018) identifying the cluster 124 of neighboring ones of the voxels 106 using the clustering algorithm 162. In one or more examples, according to the method 2000, the step of (block 2018) identifying includes a step of (block 2020) clustering the neighboring ones of the voxels 106 based on the clustering algorithm 162 that satisfies at least one clustering parameter 128. The step of (block 2020) clustering the voxels 106 results in or provides the cluster 124.

In one or more examples, the at least one clustering parameter 128 includes the spatial dimension 132 (FIG. 3) between each one of the voxels 106 and an adjacent one of the voxels 106. In one or more examples, the at least one clustering parameter 128 also includes the non-spatial dimension 164 (FIG. 3), such as z-scores or normalized z-scores, between each one of the voxels 106 and an adjacent one of the voxels 106.

In one or more examples, according to the method 1000, the step of (block 2020) clustering the voxels 106 includes a step of identifying ones of the voxels 106 in which the absolute value of the z-score 118 is above the threshold value 120 of the z-score 118 and a step of forming the cluster 124 of the neighboring ones of the voxels 106 that satisfies at least one clustering parameter 128, such as spatial closeness and z-score closeness.

In one or more examples, the method 2000 includes a step of (block 2022) outputting the cluster-boundary parameter 122 of the cluster 124. The cluster 124 includes or is formed by a grouping of the neighboring ones of the voxels 106. In one or more examples, the step of (block 2022) outputting the cluster-boundary parameter 122 includes a step of determining the cluster-boundary parameter 122 of the cluster 124.

In one or more examples, the method 2000 includes a step of (block 2024) classifying the cluster 124. The cluster 124 is classified as the defect 100 when the cluster-boundary parameter 122 of the cluster 124 is above the parameter threshold 126. The cluster 124 is classified as not the defect 100 when the cluster-boundary parameter 122 of the cluster 124 is below the parameter threshold 126. In one or more examples, the cluster 124 is classified as a correctable defect 100 or as a non-correctable defect 100.

Referring now to FIG. 3, which schematically illustrates an example of the inspection system 158 in which examples of the method 2000 may be implemented. FIG. 3 also illustrates an example of a computer 150 for implementing the method 2000. In one or more examples, the computer 150 can be used to perform one or more of the operational steps of the method 1000, such as the step of (block 1008) analyzing the CT image 104, the step of (block 1030) determining the cluster-boundary parameter 122 of the cluster 124, the step of (block 1032) classifying the cluster 124, and the step of (block 1034) determining whether the defect 100 is correctable.

In one or more examples, an inspection system 158 includes the CT scanner 154. The CT scanner 154 is configured to scan the powder manufactured component 102 and produce the CT image 104. In one or more examples, the CT scanner 154 produces detailed tomographic images representing the interior of the powder manufactured component 102. The tomographic images are combined to form the three-dimensional CT image 104. In one or more examples, the tomographic images are processed by the computer 150 to construct the CT image 104.

Each one of the tomographic images includes a number of pixels. Each of the pixels defines a point in two-dimensional space (e.g., having X and Y-coordinates). Upon construction of the CT image 104, each pixel is given a Z-coordinate in three-dimensional space and is referred to as the voxel 106.

Each one of the pixels and, thereby, each one of the voxels 106 is displayed in terms of relative radiodensity. The intensity 108 of the voxel 106 represents a measurement of the mean X-ray attenuation by the material of the interior of the powder manufactured component 102, which generally corresponds to the density of the material. In one or more examples, the intensity 108 has a corresponding numerical value, for example, on the Hounsfield scale from +3,071 (e.g., most attenuation) to −1,024 (e.g., least attenuation).

In one or more examples, the inspection system 158 includes the computer 150. The computer 150 includes any suitable computing device. The CT image 104 is provided to the computer 150 for analysis. The computer 150 performs analysis of the CT image 104 for detection of the defect 100. In one or more examples, the computer 150 implements an analysis algorithm using the numerical values for the intensity 108 of each one of the voxels 106 at the corresponding X, Y, Z-coordinate as inputs.

Figure 4:
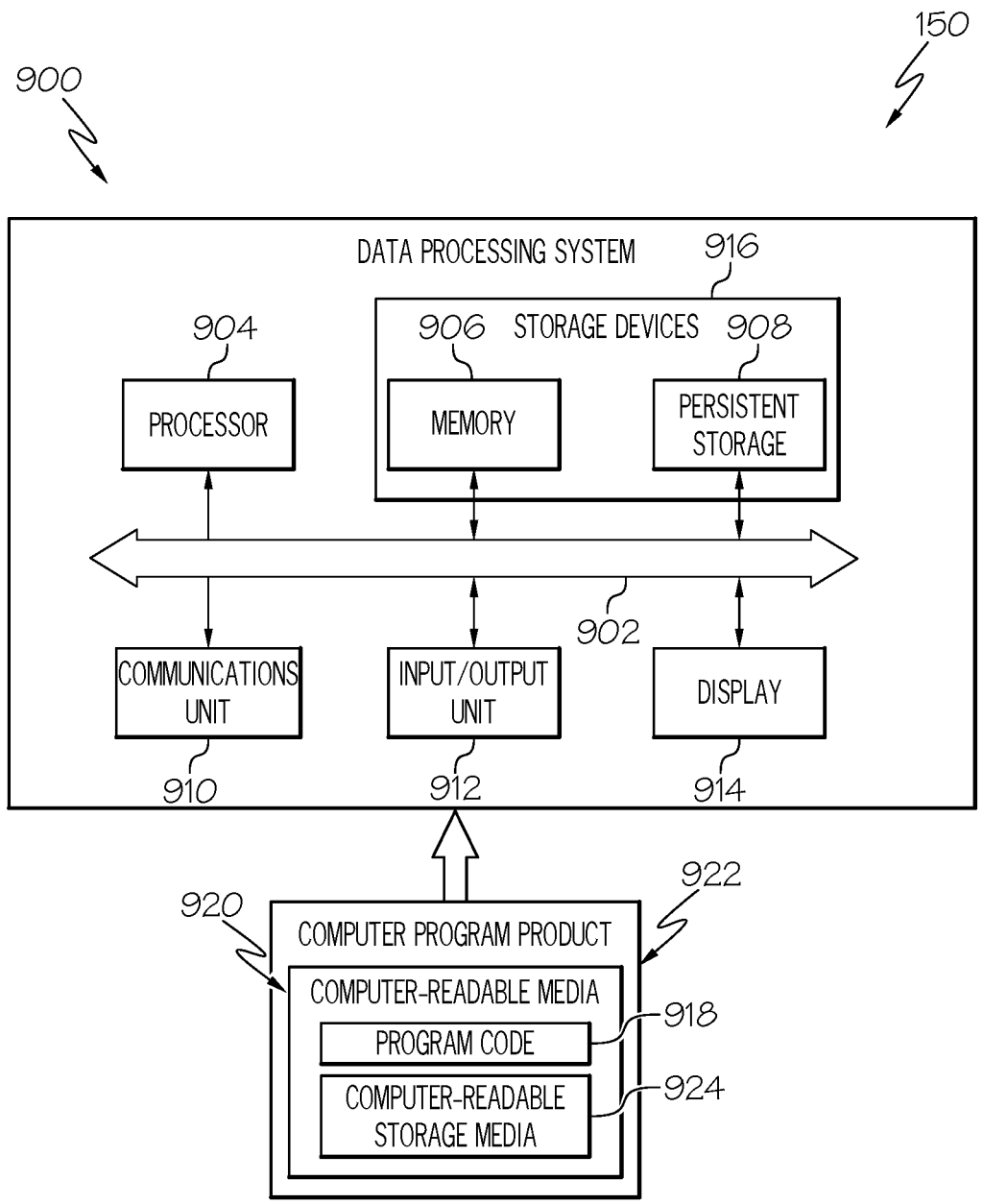
FIG. 4 is a block diagram of an example of a data processing system.

Referring now to FIG. 4, which schematically illustrates an example of a data processing system 900 and a computer program product 922 for processing the computed tomography image 104 and detecting the defect 100 in the powder manufactured component 102. Examples of the data processing system 900 and/or the computer program product 922 may adapted to implement examples of the method 1000 (FIG. 1) and/or the method 2000 (FIG. 2). Examples of the computer 150 (FIG. 3) may include the data processing system 900 and/or utilize the computer program product 922. In one or more examples, the computer 150 and/or the data processing system 900 implement or execute the clustering algorithm 162.

In one or more examples, the computer program product 922 includes non-transitory computer-readable medium 920 that includes program code 918. The data processing system 900 includes at least one processor 904. When the program code 918 is executed by one or more processors 904, the program code 918 causes the one or more processors 904 to perform operations.

In one or more examples, the operations include defining the part boundary 134 for the powder manufactured component 102 represented in the CT image 104. The voxels 106 are located within the part boundary 134.

In one or more examples, the operations include calculating the average value 112 for intensity 108 of each one of the voxels 106 in the neighborhood 160 of the CT image 104 of the powder manufactured component 102. In one or more examples, the operation of calculating the average value 112 for the intensity 108 of each one of the voxels 106 includes averaging the original value 110 for the intensity 108 of one of the voxels 106 and the original value 110 for the intensity 108 of every other one of the voxels 106 in the neighborhood 160. In one or more examples, the operation of calculating the average value 112 for the intensity 108 of each one of the voxels 106 includes performing a three-dimensional gaussian smoothing operation.

In one or more examples, the operations include calculating the difference value 114 for the intensity 108 of each one of the voxels 106 in the neighborhood. The difference value 114 being the difference between the average value 112 of the intensity 108 and the original value 110 for the intensity 108 of each one of the voxels 106.

In one or more examples, the operations include calculating the standard deviation 116 for the intensity 108 of the voxels 106 in the neighborhood 160. In one or more examples, the operations include calculating the z-score 118 for each one of the voxels 106.

In one or more examples, the operations include discarding ones of the voxels 106 in which the absolute value of the z-score 118 is less than the threshold value 120 of the z-score 118. In one or more examples, the operations include clustering the voxels 106 based on the clustering algorithm 162 that satisfies at least one clustering parameter 128 to identify the cluster 124 of neighboring ones of the voxels 106. The clustering operation results in or provides the cluster 124.

In one or more examples, the operations include classifying the cluster 124, which includes a grouping of the neighboring ones of the voxels 106, as the defect 100 when the cluster-boundary parameter 122 of the cluster 124 is above the parameter threshold 126. In one or more examples, the operations include classifying the cluster 124, which includes a grouping of the neighboring ones of the voxels 106, as not the defect 100 when the cluster-boundary parameter 122 of the cluster 124 is below the parameter threshold 126.

In one or more examples, the operations include classifying the cluster 124, which includes a grouping of the neighboring ones of the voxels 106, as the defect 100 that is correctable or that is not correctable.

Figure 5:
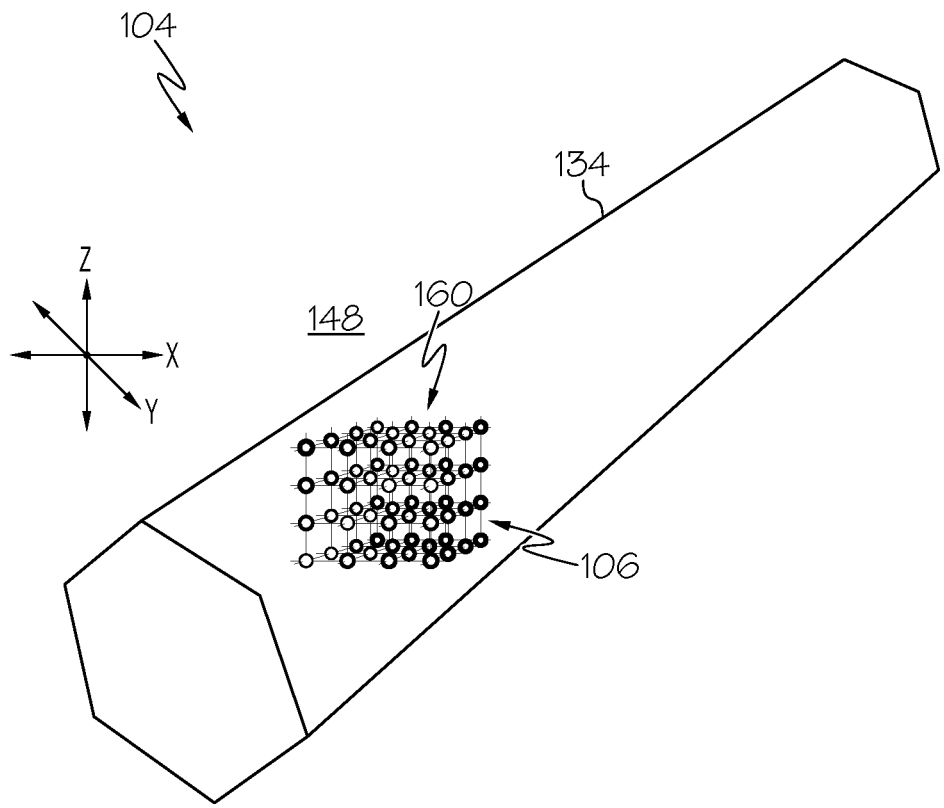
FIG. 5 is an illustration of an example of a computed tomography image.

FIG. 5 illustrates an example of the CT image 104 (FIG. 3). The CT image 104 includes a number of the voxels 106 and illustrates an example of the neighborhood 160. The voxels 106 represent an interior of the powder manufactured component 102 and the part boundary 134 of the powder manufactured component 102 in the CT image 104. In FIG. 5, only a portion of the voxels 106, representing a portion of the interior of the powder manufactured component 102, such as the neighborhood 160, are illustrated.

Figure 6:
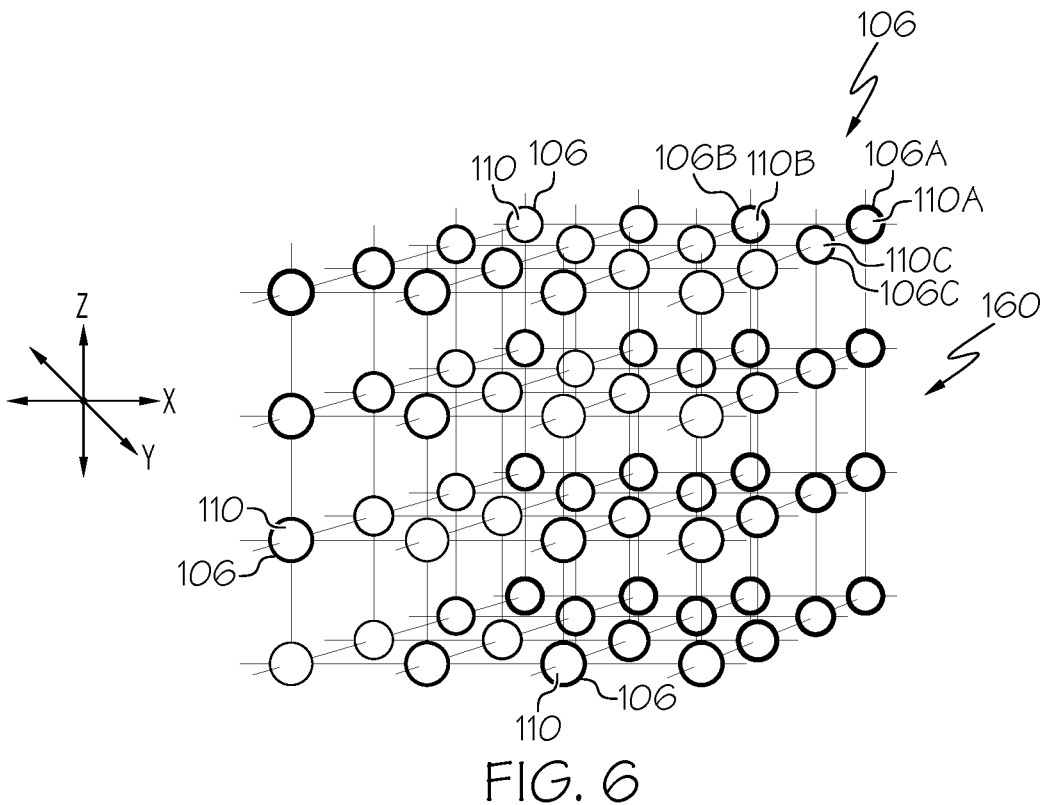
FIG. 6 is an illustration of an example of a portion of a plurality of voxels of the computed tomography image shown in FIG. 6.

FIG. 6 illustrates an example of a portion of the voxels 106, such as the neighborhood 160 of the voxels 106 shown in FIG. 5. Generally, the voxels 106 are arranged in a grid formation and each one of the voxels 106 has a unique X, Y, Z-coordinate. As illustrated in FIG. 6, each one of the voxels 106 includes the original value 110 for the intensity 108 as represented in the CT image 104 (FIG. 5). As an example, a first voxel 106A has a first original value 110A for the intensity 108, a second voxel 106B has a second original value 110B for the intensity 108, a third voxel 106C has a third original value 110C, etc.

Figure 7:
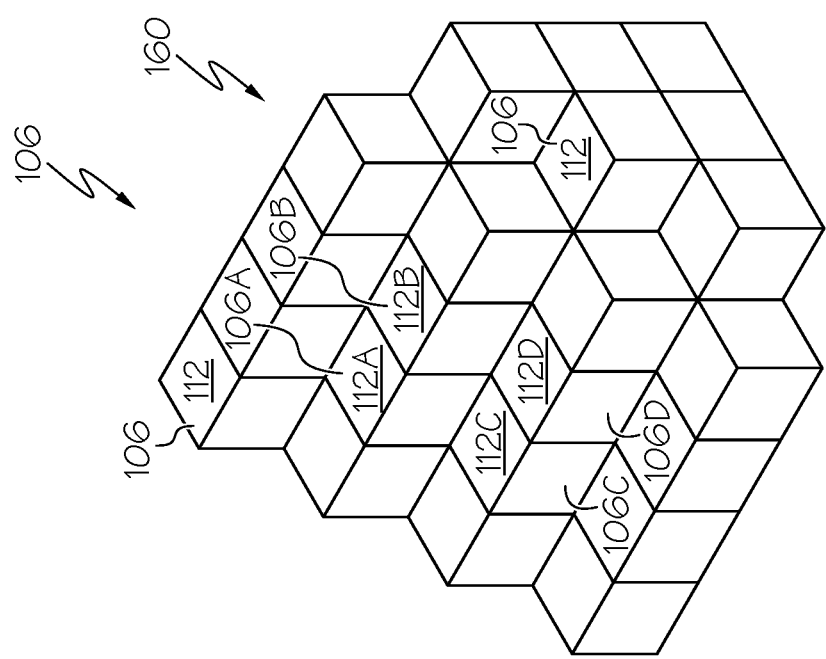
FIG. 7 is an illustration of an example of a plurality of voxels, depicting each one of the voxels having a computed average value for intensity.

FIG. 7 illustrates an example of a portion of the voxels 106, such as a portion of the neighborhood 160 of the voxels 106 shown in FIG. 6. As illustrated in FIG. 7, each one of the voxels 106 has the average value 112 for the intensity 108. In one or more examples, the average value 112 for the intensity 108 of each one of the voxels 106 is calculated or otherwise determined according to the method 1000 (FIG. 1). In one or more examples, the average value 112 for the intensity 108 of each one of the voxels 106 is computed or otherwise determined according to the method 2000 (FIG. 2). As an example, the first voxel 106A has a first average value 112A for the intensity 108, the second voxel 106B has a second average value 112B for the intensity 108, the third voxel 106C has a third average value 112C, a fourth voxel 106D has a fourth average value 112D for the intensity 108, etc.

Figure 8:
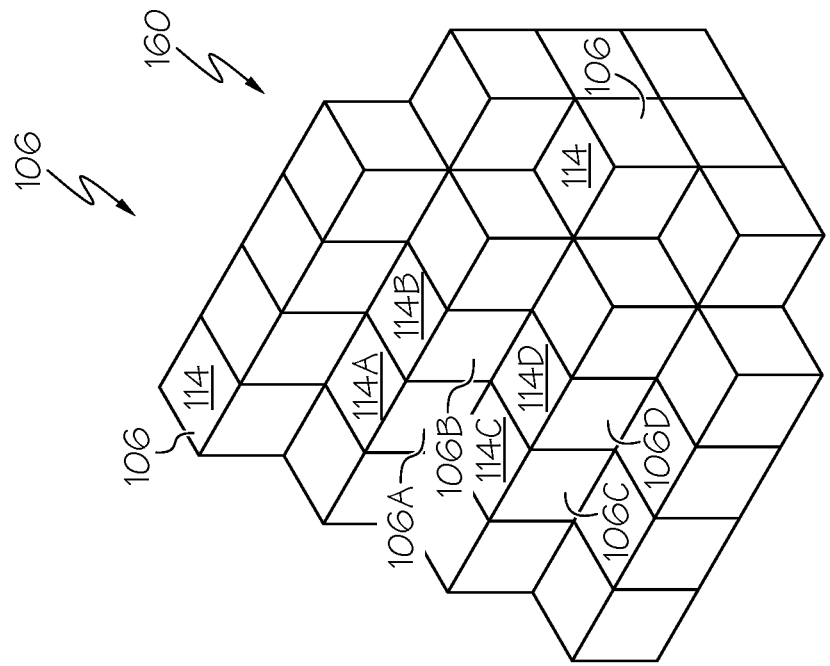
FIG. 8 is an illustration of an example of the plurality of voxels shown in FIG. 7, depicting each one of the voxels having a computed difference value for intensity.

FIG. 8 illustrates an example of a portion of the voxels 106, such as the portion of the neighborhood 160 of the voxels 106 shown in FIG. 7. As illustrated in FIG. 8, each one of the voxels 106 has the difference value 114 for the intensity 108. In one or more examples, the difference value 114 for the intensity 108 of each one of the voxels 106 is calculated or otherwise determined according to the method 1000 (FIG. 1). In one or more examples, the difference value 114 for the intensity 108 of each one of the voxels 106 is computed or otherwise determined according to the method 2000 (FIG. 2). As an example, the first voxel 106A has a first difference value 114A for the intensity 108, the second voxel 106B has a second difference value 114B for the intensity 108, the third voxel 106C has a third difference value 114C, a fourth voxel 106D has a fourth difference value 114D for the intensity 108, etc.

Figure 9:
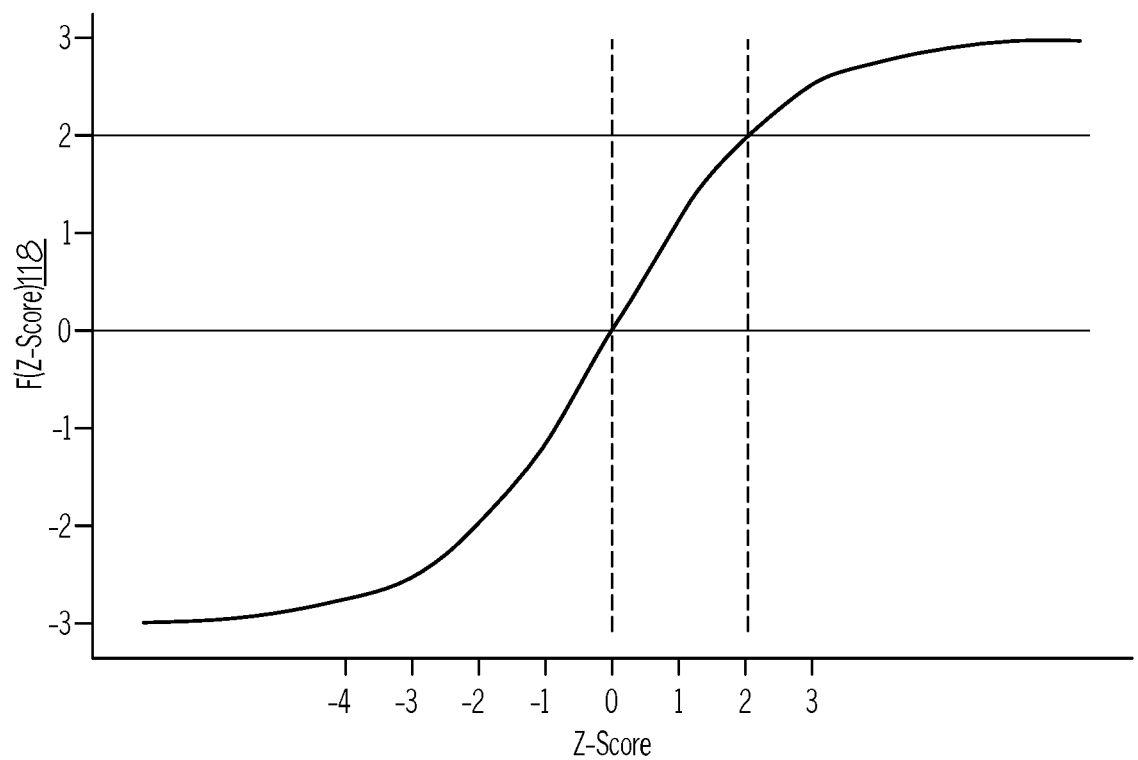
FIG. 9 is a graphical illustration of an example of a transform that at least normalizes extreme values for z-scores of the voxels.

FIG. 9 graphically illustrates an example of a transform that at least normalizes extreme values for the z-scores 118 of the voxels 106. In one or more examples, when clustering the voxels 106 using spatial dimensions 132 (e.g., distance between voxels 106) and non-spatial dimensions 164 (e.g., closeness of z-score values), the transform (shown in FIG. 9) is applied to the non-spatial dimensions 164 in order to at least normalize the non-spatial dimensions 164 in order to treat them as a fourth coordinate for clustering. In other words, FIG. 9 illustrates an example of transformation of the z-scores to normalized z-scores.

Figure 10:
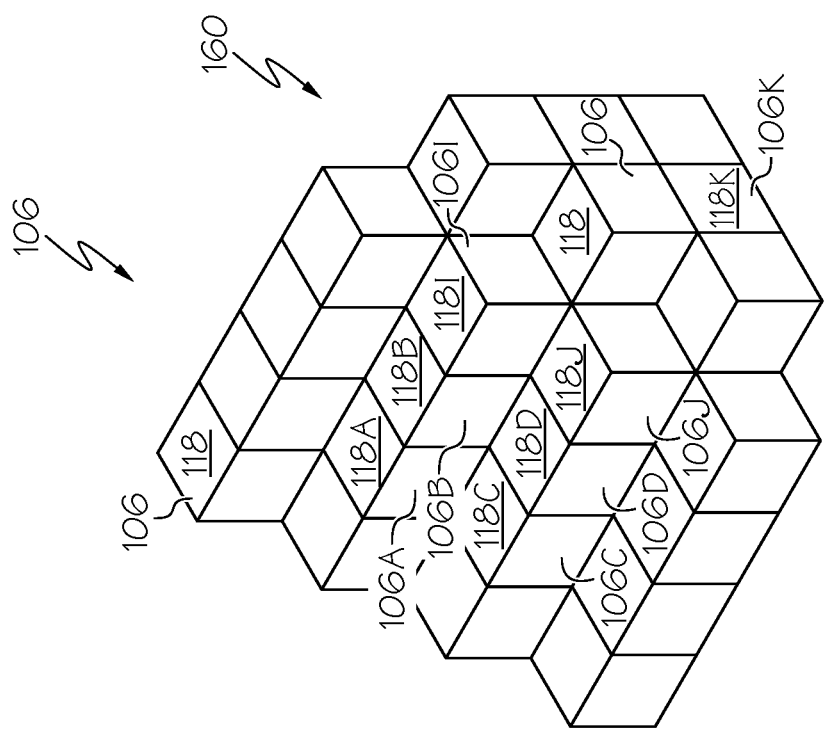
FIG. 10 is an illustration of an example of the plurality of voxels shown in FIG. 8, depicting each one of the voxels having a computed z-score.

FIG. 10 illustrates an example of a portion of the voxels 106, such as the portion of the neighborhood 160 of the voxels 106 shown in FIGS. 7 and 8. As illustrated in FIG. 10, each one of the voxels 106 has the z-score 118 assigned based on the standard deviation 116. In one or more examples, the standard deviation 116 and the z-score 118 of each one of the voxels 106 are calculated or otherwise determined according to the method 1000 (FIG. 1). In one or more examples, the standard deviation 116 and the z-score 118 of each one of the voxels 106 is computed or otherwise determined according to the method 2000 (FIG. 2). As an example, the first voxel 106A has a first z-score 118A, the second voxel 106B has a second z-score 118B, the third voxel 106C has a third z-score 118C, a fourth voxel 106D has a fourth z-score 118D, etc.

Figure 11:
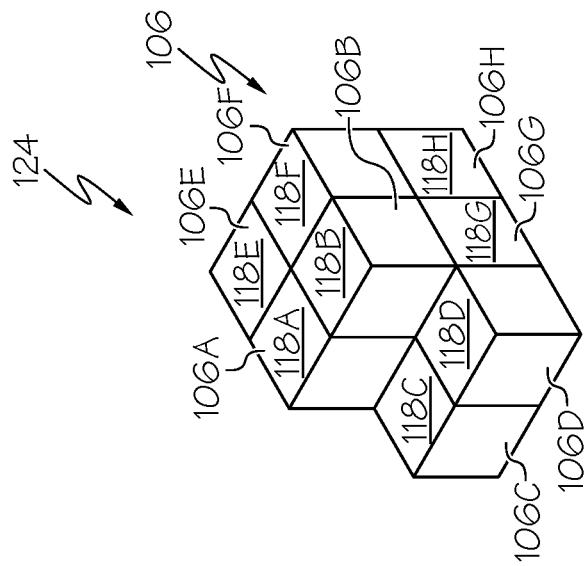
FIG. 11 is an illustration of an example of a cluster of neighboring voxels.

FIG. 11 illustrates an example of the cluster 124. The cluster 124 is formed by, or includes, a portion of the voxels 106, such as a portion of the voxels 106 shown in FIG. 10. As illustrated in FIG. 11, each of the neighboring ones of the voxels 106 forming the cluster 124 has the z-score 118 in which the absolute value of the z-score 118 is above the threshold value 120 (e.g., FIG. 9). As an example, the first z-score 118A of the first voxel 106A, the second z-score 118B of the second voxel 106B, the third z-score 118C of the third voxel 106C, the fourth z-score 118D of the fourth voxel 106D, a fifth z-score 118E of the fifth voxel 106E (not visible in FIG. 10), a sixth z-score 118F of a sixth voxel 106F (not visible in FIG. 10), a seventh z-score 118G of a seventh voxel 106G (not visible in FIG. 10), and an eighth z-score 118H of an eighth voxel 106H (not visible in FIG. 10) all have an absolute value greater than the threshold value 120 (e.g., as shown in FIG. 9).

Clustering of the neighboring ones of the voxels 106, in which the absolute value of the z-score 118 is above the threshold value 120, to form the cluster 124 is performed based on at least one of the clustering parameters 128. In one or more examples, the cluster 124 is formed according to the method 1000 (FIG. 1). In one or more examples, the cluster 124 is formed according to the method 2000 (FIG. 2).

As an example, the clustering parameter 128 is a minimum distance between the voxels 106 (e.g., the spatial dimension 132) required to be designated as neighboring ones of the voxels 106 and forming the cluster 124. In this example, each of the first voxel 106A, the second voxel 106B, the third voxel 106C, the fourth voxel 106D, the fifth voxel 106E, the sixth voxel 106F, a seventh voxel 106G, and an eighth voxel 106H are within the minimum distance of a directly adjacent voxel 106 to be designated as a neighbor by the clustering algorithm 162 and, thus, clustered together to form the cluster 124.

As another example, an absolute value of a ninth z-score 118I of a ninth voxel 106I (FIG. 10) is less than the threshold value 120. Accordingly, the ninth voxel 106I is discarded and not identified as available for clustering.

As another example, an absolute value of a tenth z-score 118J of a tenth voxel 108J (FIG. 10) is greater than the threshold value 120 and meets the clustering parameter 128 of the spatial dimension 132, for example, is within the minimum distance to another high z-score voxel. However, the tenth voxel 108J does not meet the clustering parameter 128 of the non-spatial dimension 164, for example, is not close enough in z-score with another voxel within the minimum distance. Accordingly, the tenth voxel 108J is not designated as a neighboring voxel and is not available for clustering with the first voxel 106A, the second voxel 106B, the third voxel 106C, the fourth voxel 106D, etc. by the clustering algorithm 162.

As another example, an absolute value of an eleventh z-score 118K of an eleventh voxel 106K (FIG. 10) is greater than the threshold value 120 and meets the clustering parameter 128 of the non-spatial dimension 164, for example, is close enough in z-score with another high z-score voxel. However, the eleventh voxel 108$k$ does not meet the clustering parameter 128 of the spatial dimension 132, for example, is not within the minimum distance of another voxel. Accordingly, the eleventh voxel 108$k$ is not designated as a neighboring voxel and is not available for clustering with the first voxel 106A, the second voxel 106B, the third voxel 106C, the fourth voxel 106D, etc. by the clustering algorithm 162.

In one or more examples, the clustering algorithm 162 (FIG. 3) includes or takes the form of any suitable is a data clustering algorithm. In one or more examples, the clustering algorithm 162 is a density-based clustering non-parametric algorithm: given a set of points in some space, it groups together points that are closely packed together (points with many nearby neighbors), marking as outliers points that lie alone in low-density regions (whose nearest neighbors are too far away). As an example, the clustering algorithm 162 is a density-based spatial clustering of applications with noise (DBSCAN) algorithm.

Figure 12:
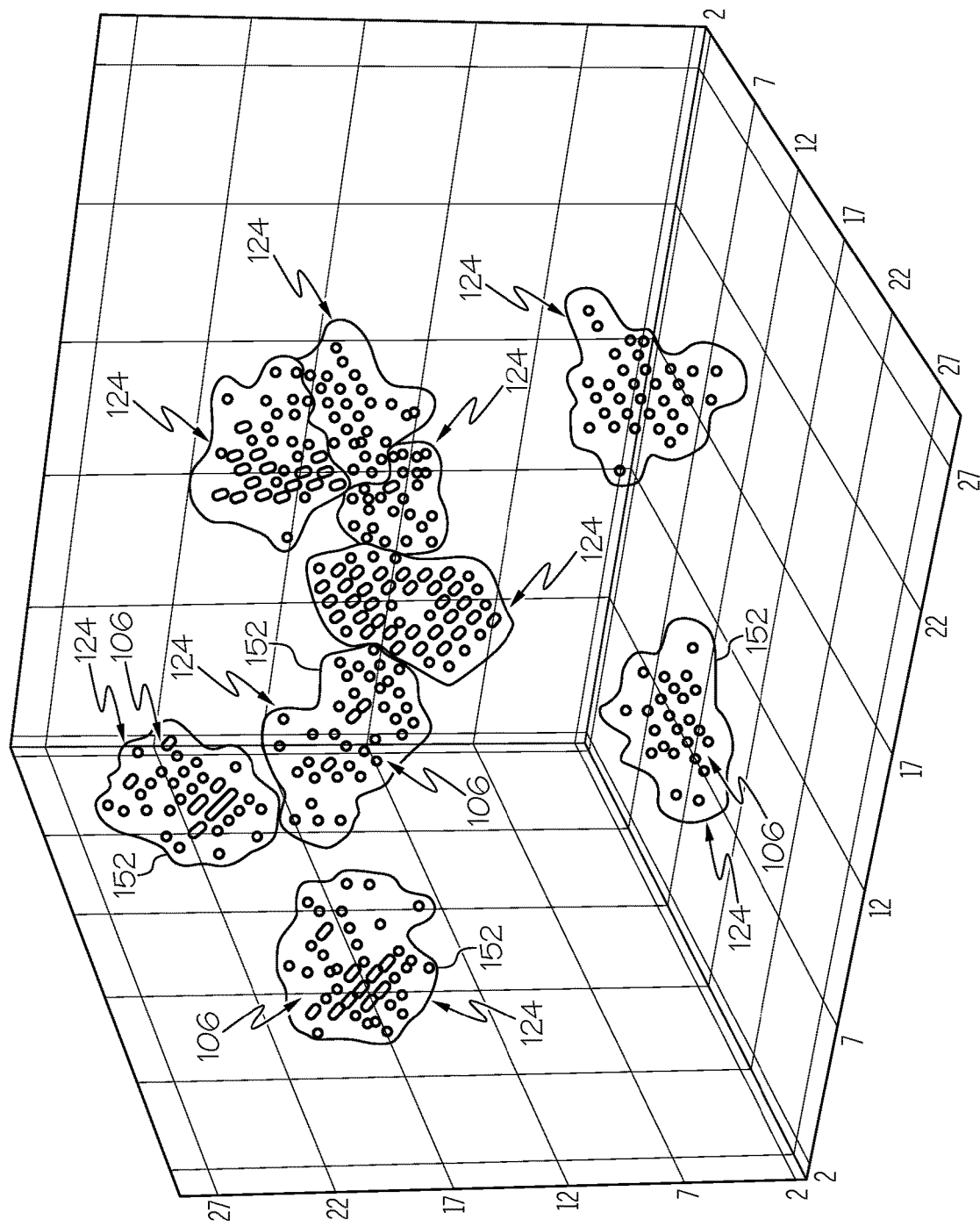
FIG. 12 is an illustration of an example of a plurality of clusters.

FIG. 12 graphically illustrates an example of a plurality of clusters 124 in three-dimensional space. Each one of the clusters 124 includes a grouping of neighboring ones of the voxels 106 in which the absolute value of the z-score 118 is greater than the threshold value 120 and which satisfies at least one clustering parameter 128. As illustrated in FIG. 12, each one of the clusters 124 may include a different number of the voxels 106.

As also illustrated in FIG. 12, each one of the clusters 124 includes the cluster-boundary 152. The voxels 106 of the cluster 124 are bound by the cluster-boundary 152. The cluster-boundary 152 includes at least one cluster-boundary parameter 122 (e.g., feret dimension and/or volume). The cluster-boundary parameter 122 of the cluster 124 is compared to the parameter threshold 126 in order to classify the cluster 124 as the defect 100 or not the defect 100. In one or more examples, the cluster-boundary parameter 122 of each one of the clusters 124 is determined (e.g., measured) and the cluster 124 is classified according to the method 1000 (FIG. 1). In one or more examples, the cluster-boundary parameter 122 of each one of the clusters 124 is determined (e.g., measured) and the cluster 124 is classified according to the method 2000 (FIG. 1).

Additionally, in one or more examples, the cluster-boundary parameter 122 is also used to determine whether the defect 100 is correctable or not correctable using the final consolidation and densification operation. Accordingly, the systems and methods disclosed herein employ computer vision to automatically scan high resolution computed tomography images of powder manufactured components to determine if defects fall within a threshold that hot isostatic can close and/or eliminate.

Referring again to FIG. 4, in one or more examples, the computer 150 (e.g., shown in FIG. 3) includes the data processing system 900. In one or more examples, the data processing system 900 includes a communications framework 902, which provides communications between at least one processor 904, one or more storage devices 916, such as memory 906 and/or persistent storage 908, a communications unit 910, an input/output (I/O) unit 912, and a display 914. In this example, the communications framework 902 takes the form of a bus system.

The processor 904 serves to execute instructions for software that can be loaded into the memory 906. In one or more examples, the processor 904 is a number of processor units, a multi-processor core, or some other type of processor, depending on the particular implementation.

The memory 906 and the persistent storage 908 are examples of the storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. The storage devices 916 may also be referred to as computer readable storage devices in one or more examples. The memory 906 is, for example, a random-access memory or any other suitable volatile or non-volatile storage device. The persistent storage 908 can take various forms, depending on the particular implementation.

For example, the persistent storage 908 contains one or more components or devices. For example, the persistent storage 908 is a hard drive, a solid state hard drive, a flash memory, a rewritable optical disk, a rewritable magnetic tape, or some combination of the above. The media used by the persistent storage 908 also can be removable. For example, a removable hard drive can be used for the persistent storage 908.

The communications unit 910 provides for communications with other data processing systems or devices, such as the CT scanner 154 (shown in FIG. 3). In one or more examples, the communications unit 910 is a network interface card.

Input/output unit 912 allows for input and output of data with other devices that can be connected to the data processing system 900. As an example, the input/output unit 912 provided a connection with a control unit of the CT scanner 154. As another example, the input/output unit 912 provides a connection for user input through at least one of a keyboard, a mouse, or some other suitable input device.

Further, the input/output unit 912 can send output to a printer. The display 914 provides a mechanism to display information to a user.

Instructions for at least one of the operating system, applications, or programs can be located in the storage devices 916, which are in communication with the processor 904 through the communications framework 902. The processes of the various examples and operations described herein can be performed by the processor 904 using computer-implemented instructions, which can be located in a memory, such as the memory 906.

The instructions are referred to as program code, computer usable program code, or computer readable program code that can be read and executed by a processor of the processor 904. The program code in the different examples can be embodied on different physical or computer readable storage media, such as the memory 906 or the persistent storage 908.

In one or more examples, the program code 918 is located in a functional form on computer readable media 920 that is selectively removable and can be loaded onto or transferred to the data processing system 900 for execution by the processor 904. In one or more examples, the program code 918 and computer readable media 920 form the computer program product 922. In one or more examples, the computer readable media 920 is computer readable storage media 924.

In one or more examples, the computer readable storage media 924 is a physical or tangible storage device used to store the program code 918 rather than a medium that propagates or transmits the program code 918.

Alternatively, the program code 918 can be transferred to the data processing system 900 using a computer readable signal media. The computer readable signal media can be, for example, a propagated data signal containing the program code 918. For example, the computer readable signal media can be at least one of an electromagnetic signal, an optical signal, or any other suitable type of signal. These signals can be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different examples can be implemented. The different examples can be implemented in a data processing system including components in addition to or in place of those illustrated for the data processing system 900. Other components shown in FIG. 4 can be varied from the examples shown. The different examples can be implemented using any hardware device or system capable of running the program code 918.

Additionally, various components of the computer 150 and/or the data processing system 900 may be described as modules. For the purpose of the present disclosure, the term "module" includes hardware, software or a combination of hardware and software. As an example, a module can include one or more circuits configured to perform or execute the described functions or operations of the executed processes described herein (e.g., the method 1000 and/or the method 2000). As another example, a module includes a processor, a storage device (e.g., a memory), and computer-readable storage medium having instructions that, when executed by the processor causes the processor to perform or execute the described functions and operations. In one or more examples, a module takes the form of the program code 918 and the computer readable media 920 together forming the computer program product 922.

Figure 13:
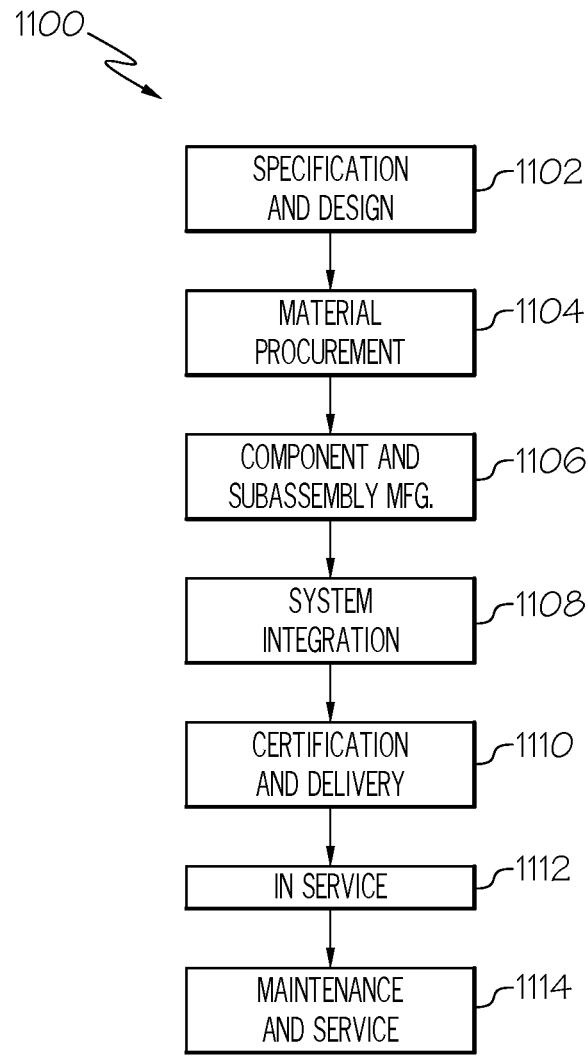
FIG. 13 is a flow diagram of an example of an aircraft service method.
Figure 14:
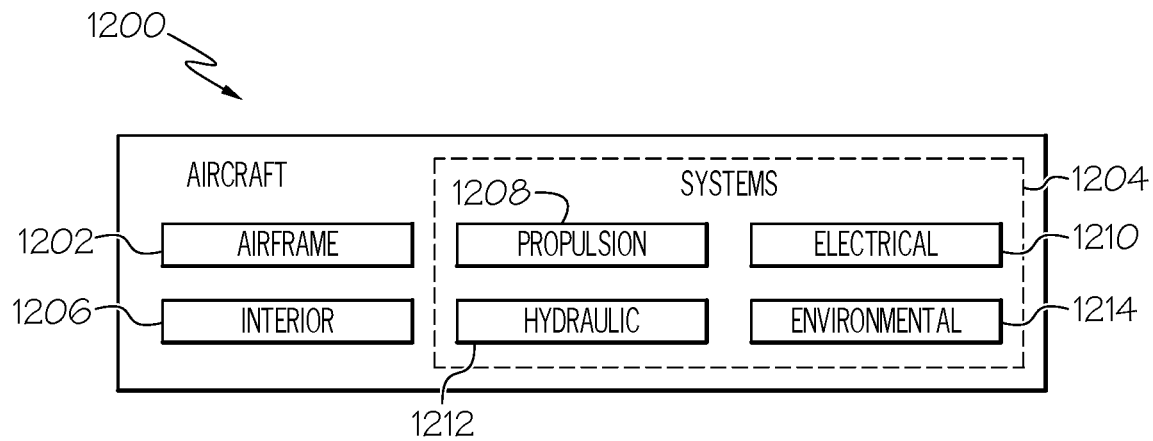
FIG. 14 is a schematic illustration of an example of an aircraft.

Referring now to FIGS. 13 and 14, examples of the method 1000, the method 2000, the computer program product 922, and/or the data processing system 900 described herein, may be related to, or used in the context of, an aircraft manufacturing and service method 1100, as shown in the flow diagram of FIG. 13 and an aircraft 1200, as schematically illustrated in FIG. 14. For example, the aircraft 1200 and/or the aircraft production and service method 1100 may utilize powder manufactures component (e.g., the powder manufactured components 102 shown in FIG. 3) manufactured and inspected using the computer program product 922, and/or the data processing system 900 and/or according to the method 1000 and/or the method 2000.

Referring to FIG. 14, which illustrates an example of the aircraft 1200. The aircraft 1200 also includes an airframe 1202 having an interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to an airframe 1202 of the aircraft 1200, such as for example, flaps, spoilers, ailerons, slats, rudders, elevators, and trim tabs. In yet other examples, the onboard systems 1204 also includes one or more other systems, such as, but not limited to, communications systems, avionics systems, software distribution systems, network communications systems, passenger information/entertainment systems, guidance systems, radar systems, weapons systems, and the like. The aircraft 1200 may include various powder manufactured components (e.g., the powder manufactured components 102 shown in FIG. 3), which form a portion of the airframe 1202, the interior 1206, and/or one or more of the onboard systems 1204.

Referring to FIG. 13, during pre-production of the aircraft 1200, the method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the method 1100 illustrated in FIG. 13 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the method 1000, the method 2000, the computer program product 922, and/or the data processing system 900 shown and described herein, may be employed during any one or more of the stages of the manufacturing and service method 1100 shown in the flow diagram illustrated by FIG. 13. In an example, manufacturing and non-destructive testing of powder manufactured components (e.g., powder manufactured components 102) using the computer program product 922 and/or the data processing system 900 and/or according to the method 1000 or the method 2000 may form a portion of component and subassembly manufacturing (block 1106) and/or system integration (block 1108). Further, manufacturing and nondestructive testing of powder manufactured components (e.g., powder manufactured components 102) using the computer program product 922 and/or the data processing system 900 and/or according to the method 1000 or the method 2000 may be implemented in a manner similar to components or subassemblies prepared while the aircraft 1200 is in service (block 1100). Also, powder manufactured components (e.g., powder manufactured components 102) manufactured and nondestructive tested using the computer program product 922 and/or the data processing system 900 and/or according to the method 1000 or the method 2000 may be utilized during system integration (block 1108) and certification and delivery (block 1110). Similarly, powder manufactured components (e.g., powder manufactured components 102) manufactured and nondestructive tested using the computer program product 922 and/or the data processing system 900 and/or according to the method 1000 or the method 2000 may be utilized, for example and without limitation, while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 3-12 and 14, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 3-12 and 14, referred to above, need be included in every example and not all elements, features, and/or components described herein are necessarily depicted in each illustrative example. Accordingly, some of the elements, features, and/or components described and illustrated in FIGS. 3-12 and 14 may be combined in various ways without the need to include other features described and illustrated in FIGS. 3-12 and 14, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 3-12 and 14, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 3-12 and 14, and such elements, features, and/or components may not be discussed in detail herein with reference to each of FIGS. 3-12 and 14. Similarly, all elements, features, and/or components may not be labeled in each of FIGS. 3-12 and 14, but reference numerals associated therewith may be utilized herein for consistency.

In FIGS. 1, 2 and 13, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 1, 2 and 13 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the method 1000, the computer-implemented method 2000, the non-transitory computer-readable medium 920, and the data-processing system 900 have been shown and described, modifications may occur to those skilled in the art upon reading the specification. The present application includes such modifications and is limited only by the scope of the claims.

What is claimed is:

1. A method for detecting a defect in a powder manufactured component, comprising steps of:
    calculating an average value for intensity of each one of a plurality of voxels within a neighborhood of a computed tomography image;
    calculating a difference value for the intensity of each one of the voxels in the neighborhood, wherein the difference value is a difference between the average value for the intensity and an original value for the intensity of each one of the voxels;
    calculating a standard deviation of the intensity based on the difference value for the voxels in the neighborhood;
    calculating a z-score for each one of the voxels;
    discarding ones of the voxels in which an absolute value of the z-score is less than a threshold value of the z-score;
    identifying a cluster of neighboring ones of the voxels using a clustering algorithm;
    determining a cluster-boundary parameter of the cluster; and
    classifying the cluster as the defect when the cluster-boundary parameter of the cluster is above a parameter threshold.

2. The method of claim 1, wherein the step of calculating the average value for the intensity of each one of the voxels comprises performing a three-dimensional gaussian smoothing operation.

3. The method of claim 1, wherein the step of identifying the cluster comprises clustering the neighboring ones of the voxels based on the clustering algorithm that satisfies at least one clustering parameter.

4. The method of claim 3, wherein the at least one clustering parameter comprises a spatial dimension between each one of the voxels and an adjacent one of the voxels.

5. The method of claim 4, wherein the at least one clustering parameter further comprises a non-spatial dimension.

6. The method of claim 5, wherein the non-spatial dimension is a normalized z-score.

7. The method of claim 1, further comprising filtering the cluster based on a number of the voxels forming the cluster.

8. The method of claim 1, wherein:
    the cluster-boundary parameter comprises a feret dimension of the cluster;
    the parameter threshold comprises a minimum feret dimension of the defect; and
    the cluster is classified as the defect when the feret dimension of the cluster is equal to or greater than the minimum feret dimension of the defect.

9. The method of claim 1, wherein:
    the cluster-boundary parameter comprises a volume of the cluster;
    the parameter threshold comprises a minimum volume of the defect; and
    the cluster is classified as the defect when the volume of the cluster is equal to or greater than the minimum volume of the defect.

10. The method of claim 1, further comprising defining a part boundary for the powder manufactured component represented in the computed tomography image,
    wherein the voxels are located within the part boundary.

11. The method of claim 1, further comprising:
    forming the powder manufactured component;
    performing a computed tomography operation on the powder manufactured component to generate the computed tomography image; and determining whether the defect is correctable by a consolidation operation.

12. A computer-implemented method for processing a computed tomography image to detect a defect in a powder manufactured component, the method comprising steps of:
    inputting the computed tomography image;
    defining a part boundary for the powder manufactured component represented in the computed tomography image, wherein voxels of the computed tomography image are located within the part boundary;
    computing an average value for intensity of each one of a plurality of voxels within a neighborhood;
    computing a difference value for the intensity of each one of the voxels in the neighborhood, wherein the difference value is a difference between the average value for the intensity and an original value for the intensity of each one of the voxels;
    computing a standard deviation for the intensity, based on the difference value, of the voxels in the neighborhood;
    computing a z-score for each one of the voxels;
    discarding ones of the voxels in which an absolute value of the z-score is less than a threshold value of the z-score;
    identifying a cluster of neighboring ones of the voxels using a clustering algorithm;
    outputting a cluster-boundary parameter of the cluster; and
    classifying the cluster as the defect when the cluster-boundary parameter of the cluster is above a parameter threshold.

13. The method of claim 12, wherein the step of computing the average value for the intensity comprises performing a three-dimensional gaussian smoothing operation.

14. The method of claim 12, wherein the step of identifying the cluster comprises clustering the neighboring ones of the voxels based on the clustering algorithm that satisfies at least one clustering parameter.

15. The method of claim 14, wherein the at least one clustering parameter comprises a spatial dimension between each one of the voxels and an adjacent one of the voxels.

16. The method of claim 15, wherein the at least one clustering parameter further comprises a non-spatial dimension between each one of the voxels and an adjacent one of the voxels.

17. The method of claim 10, wherein:
    the cluster-boundary parameter comprises at least one of:
        a feret dimension of the cluster; and
        a volume of the cluster;
    the parameter threshold comprises at least one of:
        a minimum feret dimension of the defect; and
        a minimum volume of the defect; and
    the cluster is classified as the defect when the feret dimension of the cluster is equal to or greater than the minimum feret dimension of the defect or when the volume of the cluster is equal to or greater than the minimum volume of the defect.

18. The method of claim 12, further comprising determining whether the defect is correctable by a consolidation operation.

19. A non-transitory computer-readable medium comprising program code that, when executed by one or more processors, causes the one or more processors to perform operations comprising:
    calculating an average value for intensity of each one of a plurality of voxels within a neighborhood of a computed tomography image of a powder manufactured component;
    calculating a difference value for the intensity of each one of the voxels in the neighborhood, wherein the difference value is a difference between the average value for the intensity and an original value for the intensity of each one of the voxels;
    calculating a standard deviation for the intensity based on the difference value of the voxels in the neighborhood;
    calculating a z-score for each one of the voxels;
    discarding ones of the voxels in which an absolute value of the z-score is less than a threshold value of the z-score;
    clustering the voxels based on a clustering algorithm that satisfies at least one clustering parameter to identify a cluster of neighboring ones of the voxels; and
    classifying the cluster as a defect when a cluster-boundary parameter of the cluster is above a parameter threshold.

20. The non-transitory computer-readable medium of claim 19, wherein:
    the clustering parameter comprises:
        a spatial dimension between each one of the voxels and an adjacent one of the voxels; and
        a non-spatial dimension between each one of the voxels and an adjacent one of the voxels;
    the cluster-boundary parameter comprises at least one of:
        a feret dimension of the cluster; and
        a volume of the cluster; and
    the parameter threshold comprises at least one of:
        a minimum feret dimension of the defect; and
        a minimum volume of the defect; and
    the cluster is classified as the defect when the feret dimension of the cluster is equal to or greater than the minimum feret dimension of the defect or when the volume of the cluster is equal to or greater than the minimum volume of the defect.

* * * * *